United States Patent [19]

Matsumoto et al.

[11] Patent Number: 5,157,773
[45] Date of Patent: Oct. 20, 1992

[54] IMAGE DATA OUTPUT APPARATUS

[75] Inventors: Kozo Matsumoto, Tokyo; Jun Ikeda, Yokohama; Satoshi Nagata, Tama; Kunio Okada, Kawasaki; Shinya Kishimoto, Yokohama, all of Japan

[73] Assignee: Canon Kabushiki Kaisha, Tokyo, Japan

[21] Appl. No.: 683,198

[22] Filed: Apr. 10, 1991

Related U.S. Application Data

[60] Division of Ser. No. 456,229, Dec. 22, 1989, Pat. No. 5,038,298, which is a continuation of Ser. No. 25,814, Mar. 13, 1987, abandoned.

[30] Foreign Application Priority Data

| Mar. 14, 1986 | [JP] | Japan | 61-54681 |
| Mar. 14, 1986 | [JP] | Japan | 61-54682 |
| Mar. 14, 1986 | [JP] | Japan | 61-54683 |
| Mar. 14, 1986 | [JP] | Japan | 61-54684 |
| Mar. 14, 1986 | [JP] | Japan | 61-54687 |
| Mar. 14, 1986 | [JP] | Japan | 61-54690 |
| Mar. 14, 1986 | [JP] | Japan | 61-54691 |
| Jun. 2, 1986 | [JP] | Japan | 61-125882 |
| Jun. 2, 1986 | [JP] | Japan | 61-125883 |

[51] Int. Cl.$^5$ .................................................. G06F 15/20
[52] U.S. Cl. .................................... 395/375; 395/162
[58] Field of Search ............... 364/518, 521; 395/132, 395/162, 375

[56] References Cited

U.S. PATENT DOCUMENTS

| 4,297,691 | 10/1981 | Kodama et al. | 395/132 X |
| 4,638,368 | 1/1987 | Shimizu et al. | 358/256 |
| 4,682,190 | 7/1987 | Ikeda | 346/154 |
| 4,702,590 | 10/1987 | Usami | 355/14 C |
| 4,733,275 | 3/1988 | Sugiura et al. | 355/14 C |
| 4,809,217 | 2/1989 | Floro et al. | 364/900 |
| 5,016,191 | 5/1991 | Radochonski | 395/132 |
| 5,053,867 | 10/1991 | Yamamoto et al. | 358/80 |

Primary Examiner—Heather R. Herndon
Attorney, Agent, or Firm—Fitzpatrick, Cella, Harper & Scinto

[57] ABSTRACT

An image data output apparatus is connected to an image scanner and a data processor (host computer). The image data output apparatus includes interfaces, a data converter, a video signal generator, an LBP engine unit, and the like. Multi-level image data scanned by the image scanner is converted by the data converter into data having a desired data format corresponding to the data processor. The converted data is output to the data processor through the corresponding interface. Meanwhile, the scanned image data is also supplied to the video signal generator and is converted to a drive signal for driving a semiconductor laser of the LBP engine unit.

5 Claims, 22 Drawing Sheets

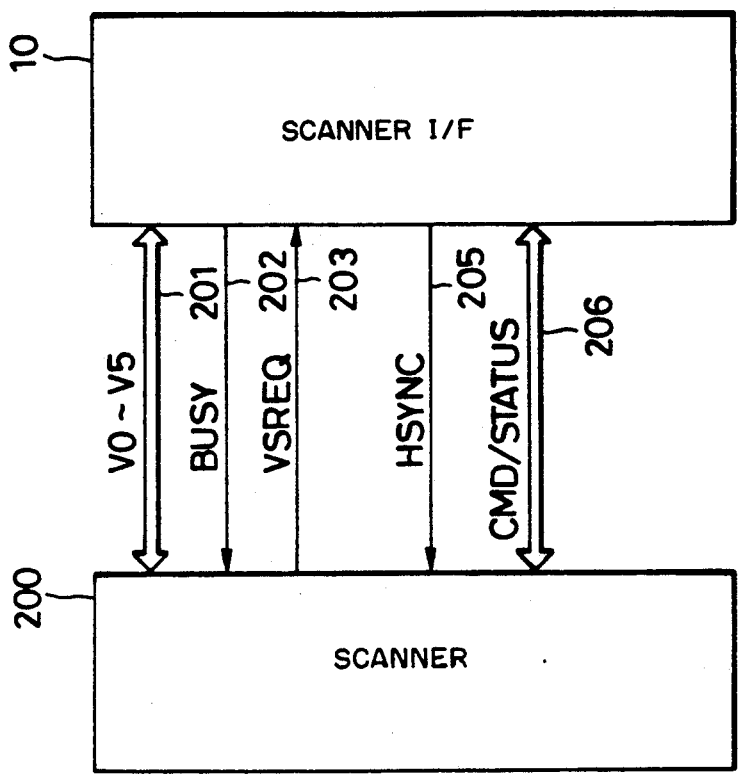
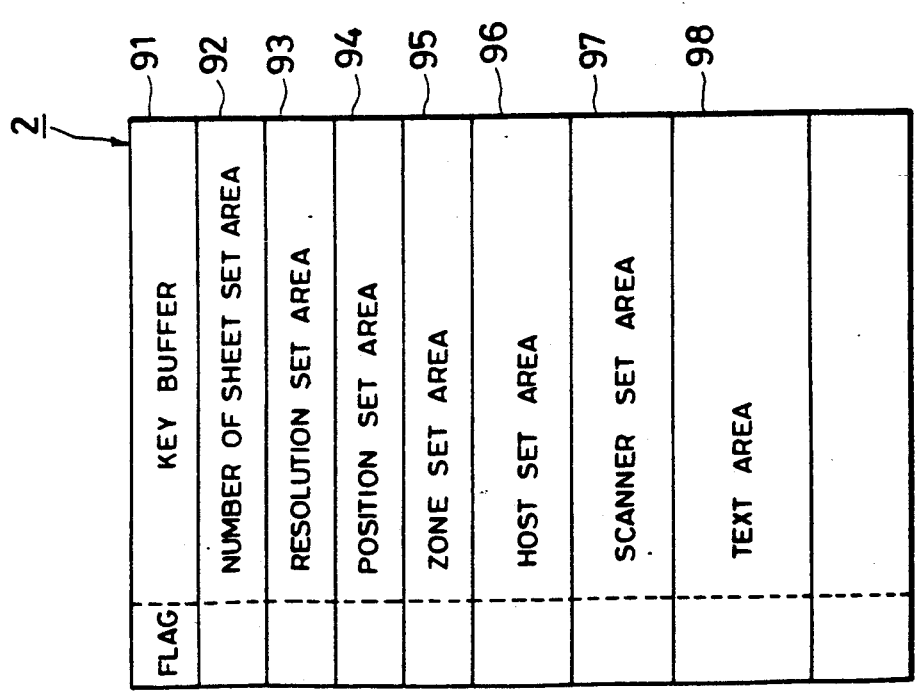

IMAGE DATA OUTPUT APPARATUS

This application is a division of application Ser. No. 07/456,229 filed Dec. 22, 1989, now U.S. Pat. No. 5,038,298, which was a continuation of application Ser. No. 07/025,814 filed Mar. 13, 1987, now abandoned.

BACKGROUND OF THE INVENTION

1. Field of the Invention

The present invention relates to an image data output apparatus for outputting image data.

2. Related Background Art

In recent years, image data scanning apparatuses connected to various data processors and printers for printing out image data have advanced performance, and have very high scanning and print-out resolutions (e.g., 300 dots/inch or higher).

However, in a data processor to which these apparatuses are connected, the high resolution data cannot be processed without modifications due to limitations such as a memory capacity, a processing speed, and the like. A display apparatus connected to the data processor is also of a low resolution type. For this reason, data quantity is decreased through data compression processing and the like and is converted to low-resolution data to perform processing.

Even if an image data scanning apparatus sends high-resolution image data to the data processor, low-resolution print data is output from the data processor to a printer. Thus, the performance of the printer cannot be sufficiently utilized.

When high-resolution image data is communicated between the data processor and the printer without modifications, this requires a long transfer time, and the performance of the printer cannot be sufficiently utilized.

In recent years, image data scanning apparatuses connected to various data processors and printers for printing out image data have advanced performance, and a compact, low-price type apparatus is also available. These apparatuses can be connected to office computers and wordprocessors.

Low-price apparatuses such as printers connected to the data processor are needed, and the type of machine to be connected is not determined. Thus, these apparatuses preferably have compatibility.

Interfaces of printers serving as image data output apparatuses have standards. For example, the "RS-232C" as a serial interface and the "Centronics" interface as a parallel interface are widely used. However, image data scanning apparatuses are new in the market and have no interface standards. For this reason, only one type of image data scanning apparatus can be connected to the data processor, and a control sequence (control program) having a specific protocol must be created.

In a conventional image data scanning apparatus, the scanned data is received by a host side without modifications. Therefore, a large volume of data must be communicated. However, the host side does not require high resolution data in the case of CRT display or page layout, resulting in inconvenience.

SUMMARY OF THE INVENTION

It is an object of the present invention to eliminate the conventional drawbacks.

It is another object of the present invention to provide an image data output apparatus.

It is still another object of the present invention to provide an image data output apparatus having an improved function.

It is still another object of the present invention to provide an image data processor which can be connected to various apparatuses.

It is still another object of the present invention to provide an image data output apparatus which can reduce a load on an apparatus connected thereto.

It is still another object of the present invention to provide an image data output apparatus which can sufficiently utilize the performance of an apparatus connected thereto.

It is still another object of the present invention to provide an image data output apparatus which can obtain a high-quality reproduced image.

It is still another object of the present invention to provide an image data output apparatus which can reproduce an image at high speed.

It is still another object of the present invention to provide an inexpensive image data output apparatus which can reproduce a high-quality image.

The above and other objects of the present invention will be apparent from the following description and claims taken in conjunction with the accompanying drawings.

BRIEF DESCRIPTION OF THE DRAWINGS

FIG. 6 is a detailed memory map of a RAM of the first embodiment;

FIG. 7 is a diagram showing connections between the scanner and a scanner interface of the first embodiment;

DETAILED DESCRIPTION OF THE PREFERRED EMBODIMENTS

An embodiment of the present invention will now be described with reference to the accompanying drawings.

Figure 1:
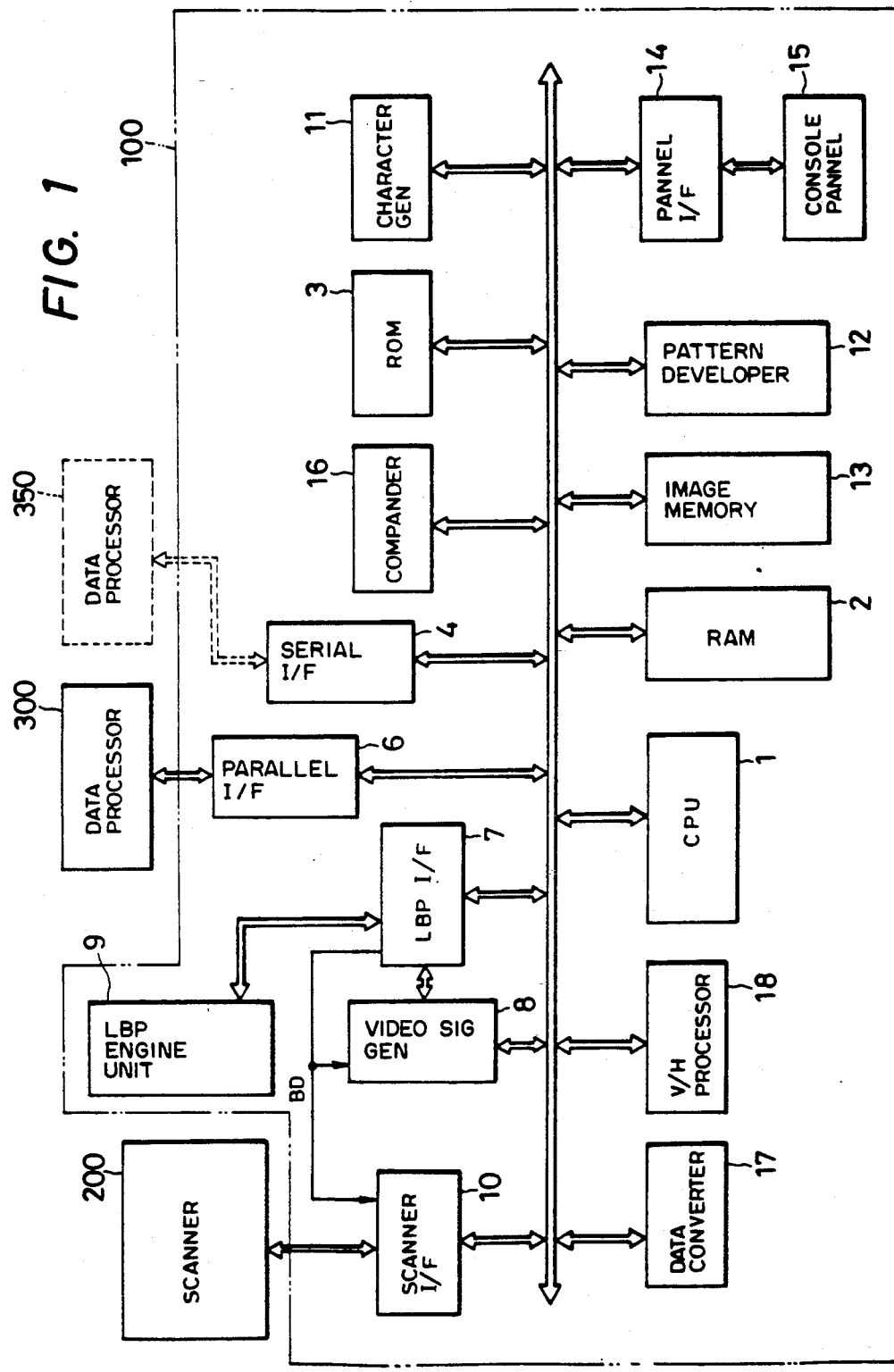
FIG. 1 is a block diagram of an image data output apparatus according to a first embodiment of the present invention.

FIG. 1 is a block diagram of a first embodiment according to the present invention. An image data output apparatus 100 as a laser beam printer of this embodiment is connected to an image data reading apparatus 200 as a scanner for reading an original. Data processors 300 and 350 as host computers are connected to the image data output apparatus 100. The data processor is connected to the apparatus 100 through a parallel interface (e.g., Centronics interface) 6, and the data processor 350 is connected thereto through a serial interface (e.g., RS-232C interface) 4. In general, either of these processors is connected to the image data output apparatus.

The image data output apparatus 100 includes a CPU (Central Processing Unit) 1 for controlling the overall apparatus in accordance with control sequences shown in flow charts (to be described later) stored in a ROM (Read-Only Memory) 3, a RAM (Random Access Memory) 2 serving as a work area of the CPU 1, the parallel interface 6 for interfacing with the host computer 300 under the control of the CPU 1, an LBP (Laser Beam Printer) interface 7 for interfacing with an LBP engine unit 9 as the mechanism unit of the LBP, and a video signal generator 8 for pulse-width modulating multi-gradation image data in correspondence with gray scale levels so as to generate a video signal for driving a semiconductor laser (to be described later) or for driving a semiconductor laser in correspondence with binary image data. The video signal generator 8 selects either of these image data or combines these data under the control of the CPU 1, thereby generating a corresponding semiconductor drive video signal.

The image data output apparatus 100 also includes a scanner interface 10 for interfacing with the scanner 200, a character generator 11 for generating character patterns corresponding to character codes of text data which is sent from the data processor 300 or 350 in the form of character codes, a pattern developer 12 for developing the character pattern from the character generator 11 and mixing and developing the character pattern with image data sent from the data processor 300 or 350, an image memory 13, as an option, for storing scanned image data from the scanner 200, a panel interface 14 for interfacing a console panel 15 with the CPU 1 in order to manually operate the image data output apparatus 100 and the scanner 200, a compander 16 for compressing/expanding the image data, a data converter 17 for converting multi-level digital image data from the scanner 200 into dither processing data or binary data in accordance with the processing modes of the data processors 300 and 350, and a V/H processor 18, as an option, for performing image data rotation processing.

Figure 2:
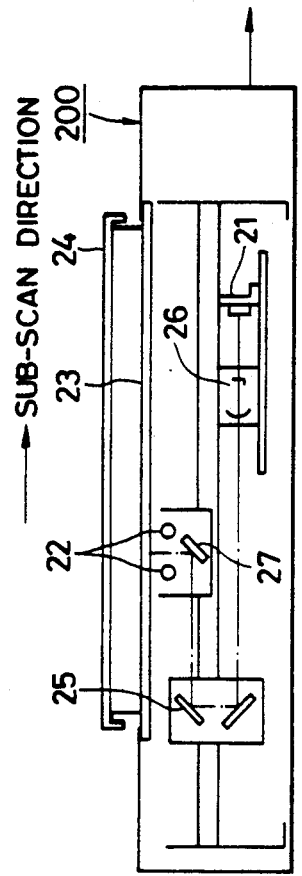
FIG. 2 is a view showing the arrangement of a scanner.

FIG. 2 shows the mechanism section of the scanner 200 in detail.

Referring to FIG. 2, an original is faced down on original glass 23 with reference to the inner left side viewed from the front side. The original is pressed against the original glass 23 by an original cover 24. The original is illuminated with a fluorescent lamp 22, and light reflected thereby is focused on a CCD 21 (image sensor) which has a plurality of light-receiving elements aligned in line, through mirrors 25 and 27 and a lens 26. The mirror 27 is moved at a speed twice that of the mirror 25. This optical unit is moved from the left to the right in synchronism with a scan timing signal from the scanner interface 10 under the PLL (Phase-Locked Loop) control by a DC servo motor, thereby performing a sub-scan operation. A resolution in the sub-scan direction is 16 lines/mm.

As for the main scan direction, a main scan width corresponds to a maximum of a 257-mm wide B4-size sheet. In order to perform main scan at 16 pels/mm, the CCD requires 4,112 ($=257\times16$) bits. In this apparatus, a CCD array sensor having about 5,000 bits of light receiving element is used to perform a scan operation.

An image of an original placed on the original glass 23 is sequentially scanned in units of lines, and 6-bit digital image signals representing gray levels are input to the scanner interface 10.

Figure 3:
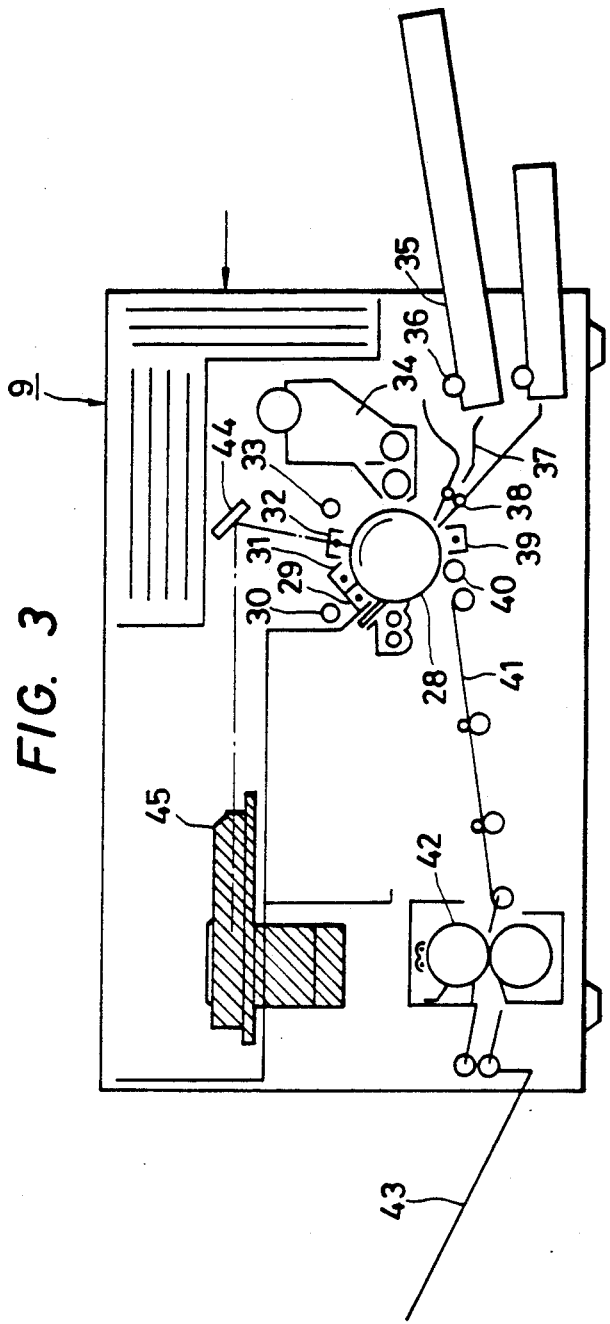
FIG. 3 is a view showing the arrangement of an LBP engine unit of the first embodiment.

FIG. 3 shows the mechanism of the LBP engine unit 9. A video signal which is sent from the video signal generator 8 in a bit-serial manner, is input to a laser scan optical system unit 45. The unit 45 comprises a semiconductor laser, a collimator lens, a rotary polygonal mirror, an F-$\theta$ lens, and an inclination correction optical system. The video signal from the video signal generator 8 is applied to the semiconductor laser to be converted into beams, and the laser beams emitted from semiconductor laser is collimated by the collimator lens to be parallel beams. The parallel beams are radiated on the polygonal mirror which rotates at high speed, thereby scanning it onto a photosensitive body 28. Thus, a latent image is formed on the photosensitive body 28.

At this time, in order to detect a timing at which the semiconductor laser scans the photosensitive surface of the photosensitive body 28, i.e., a timing at which a video signal is sent, a known laser beam detector (BD) is arranged at a predetermined position before the laser beam scans the photosensitive surface of the photosensitive body 28, so that the video signal is sent in synchronism with a laser beam detection signal (BD signal) from the detector.

The photosensitive body 28 has three layers, e.g., a conductive layer, a photosensitive layer, and an insulating layer. Therefore, process components capable of forming an image thereon are arranged therearound. The image forming components include a pre-discharger 29, a pre-discharging lamp 30, a primary charger 31, a secondary charger 32, an entier-surface exposure lamp 33, a developer 34 for developing a latent image, paper feed cassettes 35, paper feed rollers 36 for feeding a transfer sheet from the corresponding cassettes, a paper feed guide 37, registration rollers 38, a transfer charger 39 for transferring an image onto a transfer sheet, a separation roller 40 for separating the transfer sheet from the photosensitive body 28, a convey guide 41, a fixer 42, and a tray 43. With this arrangement, an image can be formed on the transfer sheet in accordance with the received video signal.

Figure 4:
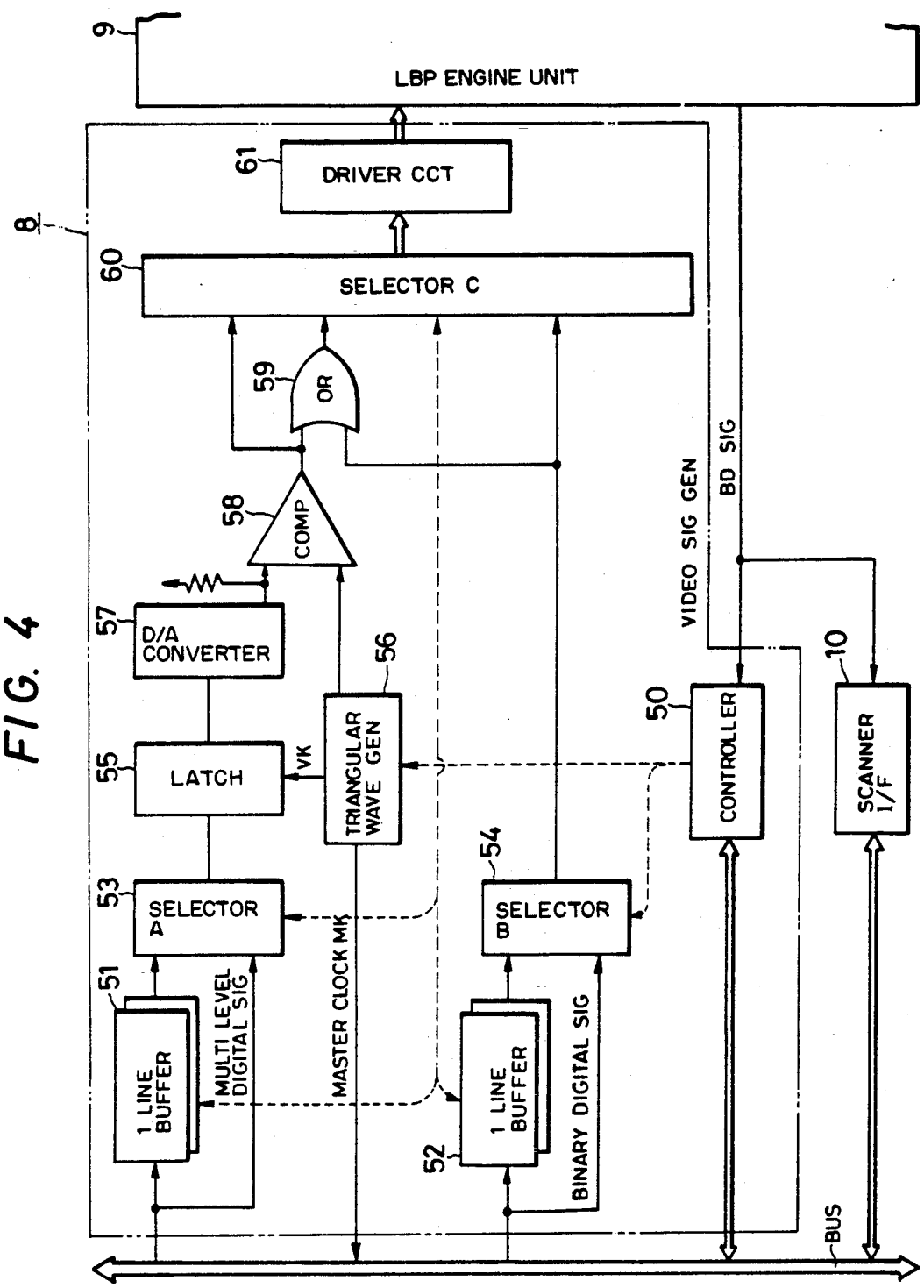
FIG. 4 is a detailed block diagram of a video signal generator of the first embodiment.

FIG. 4 shows, in detail, the video signal generator 8 for generating a video signal for causing the semiconductor laser in the LBP engine unit 9 to emit laser beams.

In FIG. 4, the video signal generator 8 includes a controller 50 for performing overall timing control, such as output selection of selectors, and line buffers 51 and 52 of a double buffer type each composed of two line buffers each having a storage capacity for one line. The line buffer 51 serves as a 6-bit parallel line buffer for a multi-level (6-bit) digital image signal, and the line buffer 52 serves as a 1-line buffer for a 1-bit binary image signal. The generator 8 also includes a selector A 53 and a selector B 54 for selecting whether an input image signal is output through the line buffers 51 and 52 or is directly output without being through the line buffers 51 and 52, a latch 55 for latching a multi-level digital, image signal, a triangular wave generator 56 for generating a triangular wave as a pattern signal (to be described later) in response to a master clock MK, a D/A converter 57 for digital-to-analog converting a digital signal latched by the latch 55 into an analog signal corresponding thereto, a comparator 58, an OR gate 59 for mixing and outputting a pulse-width modulated signal from the comparator 58 and a binary signal from the selector B 54, a selector C 60 for selecting one of the signals from the comparator 58, the selector B 54, and the OR gate 59 and outputting the selected signal as a video signal, a driver circuit 61 for converting the video signal from the selector C 60 into a drive signal for driving the semiconductor laser in the LBP engine unit 9. Note that the LBP interface is interposed between the video signal generator 8 and the LBP engine unit 9 but is omitted from FIG. 4 for the sake of simplicity.

In the video signal generator 8 of this embodiment, when a multi-level digital image signal is converted to a binary semiconductor laser drive signal to perform image formation, the digital image signal is temporarily converted to an analog signal, and the converted signal is compared with a pattern signal such as a triangular wave, thereby generating a pulse-width modulated binary signal, in order to obtain gradation. The multi-level digital image signal is latched and synchronized by the latch 55 in response to a video clock VK. The video clock VK is obtained by $\frac{1}{2}$-frequency dividing the master clock MK having a predetermined cycle by the triangular wave generator 56.

The output from the D/A converter 57 is converted to a voltage level by a resistor, and is then supplied to one input terminal of the comparator 58. The triangular wave generator 56 frequency-divides the master clock MK at a predetermined frequency dividing ratio, so as to produce a clock signal having a duty ratio of 50%. Then, the generator 56 converts this clock signal into a triangular wave using an integrator consisting of a resistor and a capacitor, and outputs the triangular wave. The triangular wave is input to the other input terminal of the comparator 58, is compared with the analog signal from the D/A converter 57, and is pulse-width modulated.

Figure 5:
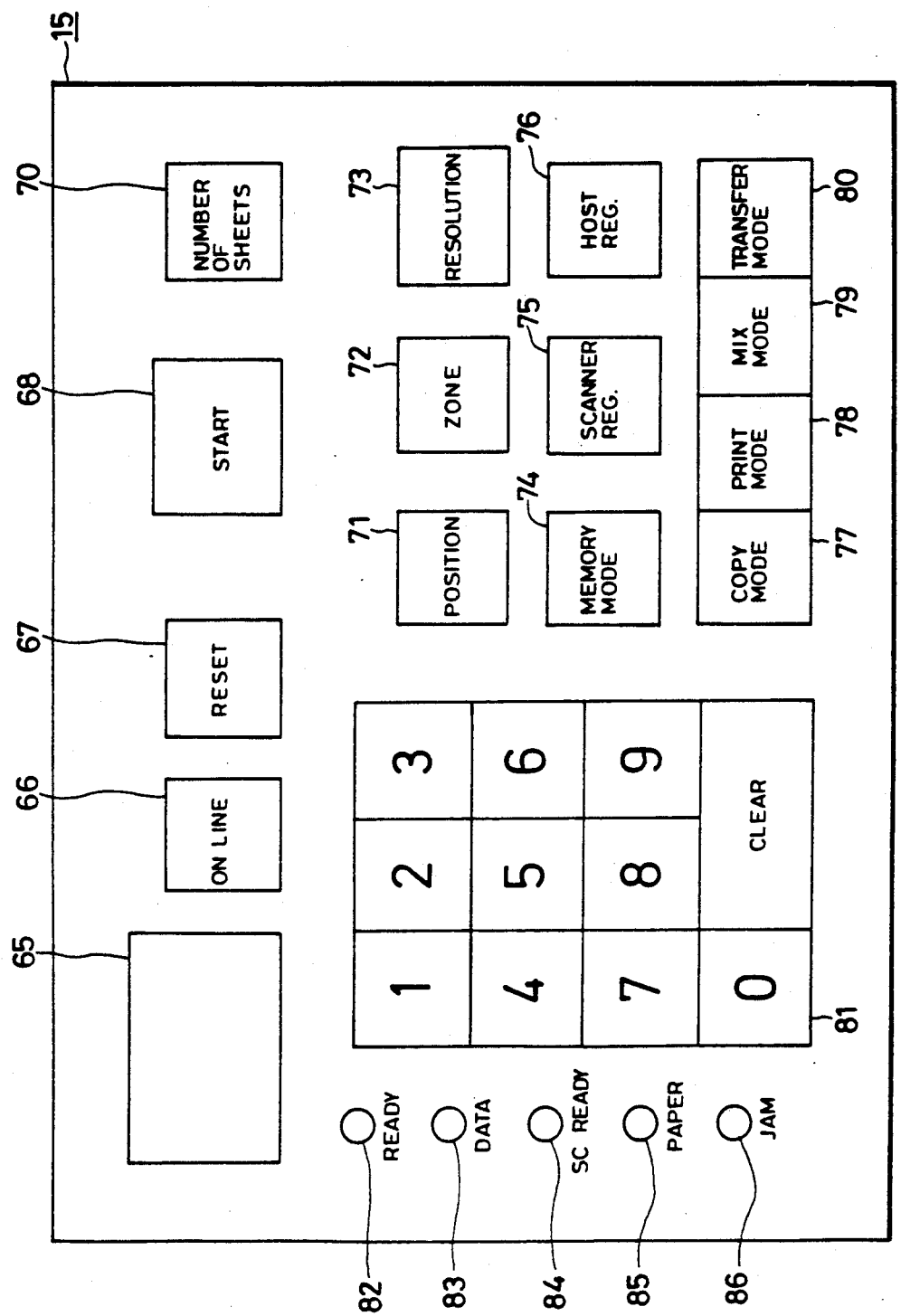
FIG. 5 is a top view of a console panel of the first embodiment.

FIG. 5 is a top view of the panel unit of the console panel 15.

The console panel 15 is adopted to manually control the image data output apparatus 100 and the scanner 200, and includes a numerical display 65 for displaying the number of sheets to be output or various set values, an on-line switch 66 for switching between an on-line mode in which the apparatus is operated under the remote control from the data processor and an off-line mode in which the apparatus is operated in accordance with inputs from the console panel 15, a reset switch 67 for initializing the apparatus, a start switch 68 for starting processing, e.g., print processing by the apparatus or a scan operation of the scanner, a number of sheet set switch 70 for setting the number of prints, a position set switch 71 for setting a position of image data in one page, a zone set switch 72 for setting a zone of image data, a resolution set switch 73 for setting a resolution of image data, and a memory mode switch 74 for storing received image data in image memory 13 or the RAM 2 when the apparatus is equipped with the image memory 13.

The console panel 15 also includes a scanner registration switch 75 for setting and registering set conditions set by the set switches 70 to 73 to the scanner 200, a host registration switch 76 for setting and registering the set conditions set by the set switches 70 to 73 to the data processors 300 and 350, and mode switches 77 to 80. The mode switches 77 to 80 consist of a copy mode switch 77 for printing out scanned image data from the scanner 200, a print mode switch 78 for setting a print mode as a mode for printing out data from the data processor 300 or 350 or held in the memory, a MIX mode switch 79 for setting a MIX mode for mixing image data from the scanner 200 and the data from the data processor 300 or 350, and a transfer mode switch 80 for setting a transfer mode for converting scanned image data from the scanner 200 in correspondence with the processing mode of the data processor 300 or 350 and transferring the converted data to the processor 300 or 350. Furthermore, the console panel 15 includes ten key switches 81 which include a clear switch for clearing input data.

In addition, the console panel 15 includes various indicators 82 to 86. The READY indicator 82 indicates that the apparatus in a ready state. The DATA indicator 83 is turned on when print data is present in the memory. The SC READY indicator 84 indicates that the scanner 200 is in the ready state, and flashes when an error occurs in the scanner. The PAPER indicator 85 indicates that no sheet is set in the apparatus or the set sheets are used up. The JAM indicator 86 indicates that recording sheet jam occurs in the mechanism section of the apparatus.

Areas shown in FIG. 6 are assigned to the RAM 2 of this embodiment.

More specifically, the RAM 2 is divided into a key buffer 91 for storing input data from ten keys 81 on the console panel 15, a number of sheet set area 92 for storing the number of sheets to be printed, a resolution set area 93 for storing a set resolution, a position set area 94 for storing a set value of position of image data within one page, a zone set area 95 for storing a set value of an image data extracting zone, a host set area 96 for storing various set values in association with the data processors 300 and 350, a scanner set area 97 for storing various set values in association with the scanner 200, and a text area 98 for storing text data sent from the data processors in the memory mode.

FIG. 7 shows the interfacial specifications between the scanner 200 and the scanner interface 10. The scanner 200 and the scanner interface 10 exchange the following signals with each other: a multi-gradation 6-bit digital image signal 201 having bits V0 to V5, a BUSY signal 202 for alarming a busy state of the printer, a VSREQ signal 203 for signalling that the optical system of the scanner 200 is set at the scan start position and the scan operation is prepared, and an HSYNC signal 205 for requesting a read operation of 1-line image data. In addition, a control bus 206 is connected between the scanner 200 and scanner interface 10 in order to transfer various status data and commands.

The operation of the image data output apparatus of this embodiment having the above arrangement will be described hereinafter with reference to the flow charts shown in FIGS. 8 to 14.

Figure 8:
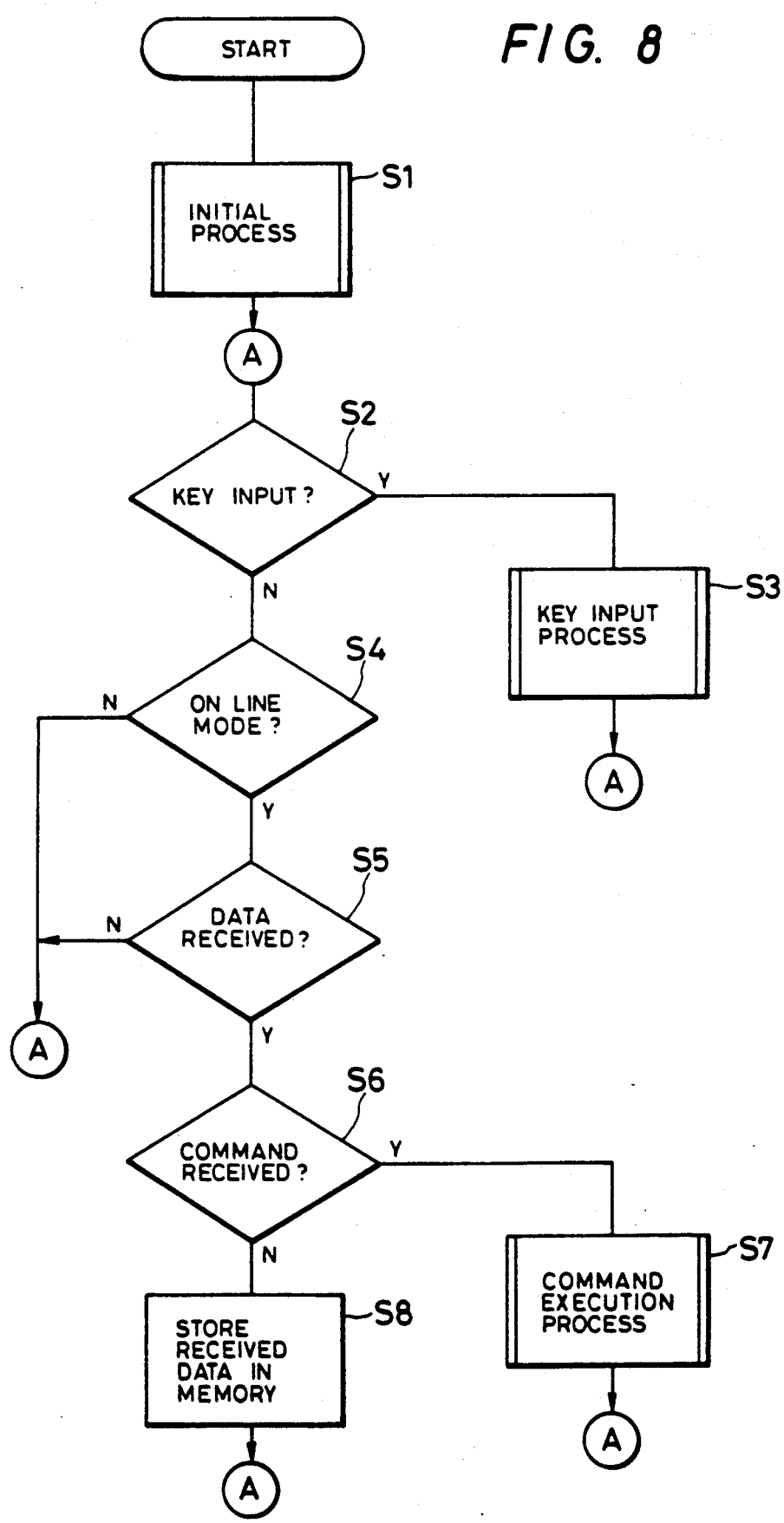
FIGS. 8 to 13 are control flow charts of the first embodiment.

FIG. 8 is a flow chart showing a control operation of this embodiment. When the power switch of the apparatus is turned on, the flow advances to step S1, and the initial process for, e.g., initializing the RAM 2 is executed. It is checked in step S2 if a key input is performed from the console panel 15. If Y (YES) in step S2, the key input process shown in FIG. 9 (to be described later) is executed in step S3 and the flow returns to step S2.

If N (NO) in step S2, the flow advances to step S4 to check if the on-line mode is set. If N in step S4, the flow returns to step S2. If Y in step S4, it is checked in step S5 if data from the data processor 300 or 350 is received. If N in step S5, the flow returns to step S2. If Y in step S5, the flow advances to step S6 to check if the received data is a command. If Y in step S6, the command execution process shown in FIG. 10 (to be described later) is executed in step S7, and the flow returns to step S2.

However, if N in step S6, this means that print data is received, and the received data is sequentially stored in the text area 98 of the RAM 2. The flow then returns to step S2.

Figure 9:
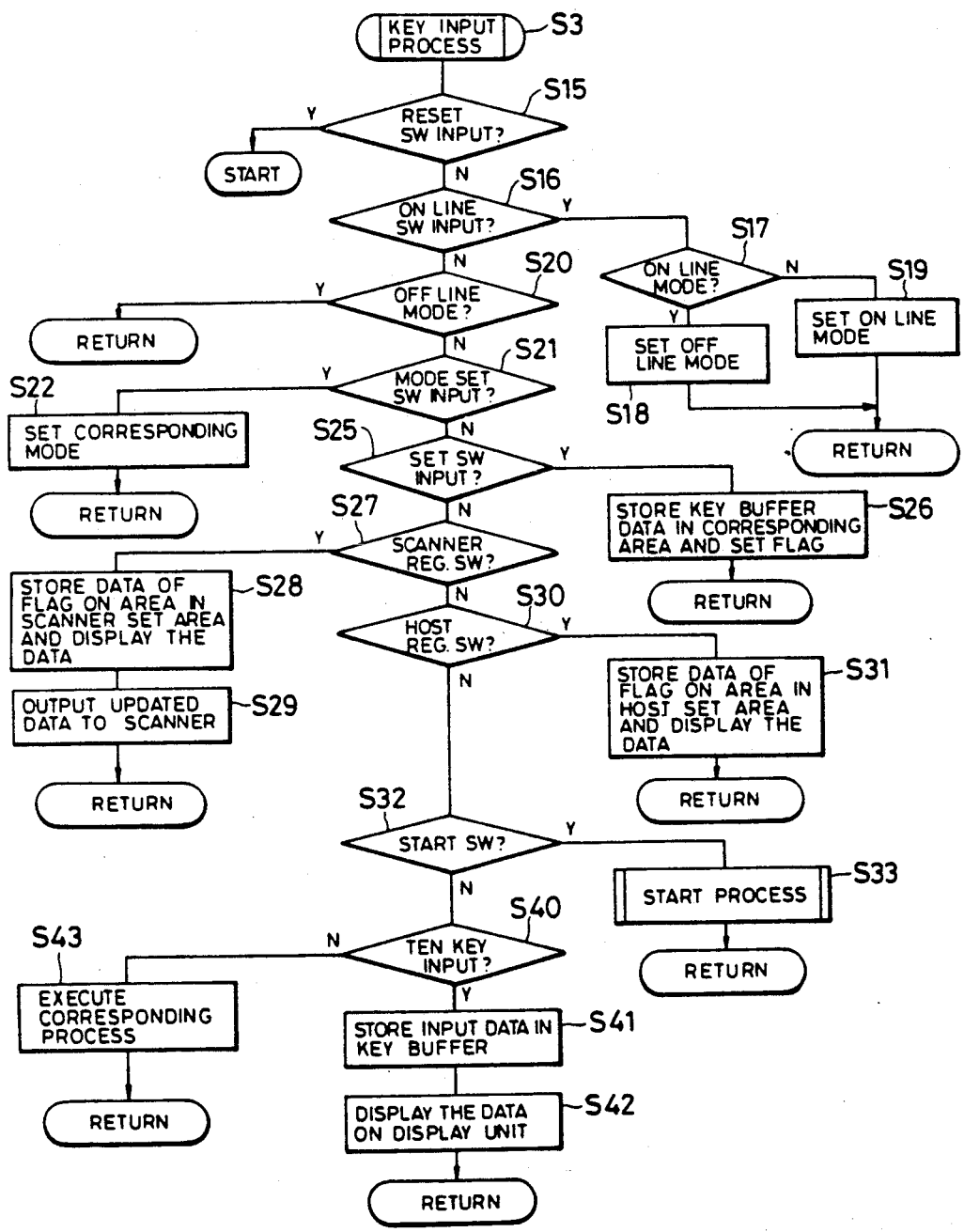

The key input process in step S3 will be described in detail with reference to the flow chart shown in FIG. 9.

If the key input is performed, it is checked in step S15 if the key input corresponds to an input from the reset switch 67. If Y in step S15, the flow returns to step S1 shown in FIG. 8 so as to perform the initial process.

If N in step S15, the flow advances to step S16 to check if the key input corresponds to an input from the on-line switch 66. If Y in step S16, the flow advances to step S17 to check if the on-line mode is set and the on-line switch 66 is turned on. If Y in step S17, the off-line mode is set in step S18, and the on-line switch 66 is turned off. The flow then returns to the main routine. If the off-line mode is currently set, the on-line mode is set in step S19, and the flow returns to the main routine. At this time, the on-line switch 66 is turned on.

If N in step S16, the flow advances to step S20 to check if the on-line mode is currently set. If Y in step S20, other operations are made invalid, and the flow returns to the main routine.

If N in step S20, the flow advances to step S21 to check if the memory mode switch 74 or the mode switches 77 to 80 are operated. If Y in step S21, the mode corresponding to the operated mode switch is set in step S22. After the corresponding mode is set, the flow returns to the main routine. If no image memory 13 is additionally mounted, the memory mode is not set, and the input of the memory mode switch 74 is ignored.

If N in step S21, the flow advances to step S25 to check if the set switches 70 to 73 are operated. If Y in step S25, the flow advances to step S26, and memory data to the key buffer 91 upon reception of a switch input is transferred to the corresponding area in the RAM 2, and an update flag is set. Then, the flow returns to the main routine. If no data is stored in the key buffer 91 and if inappropriate data is stored therein, an input error can be alarmed without updating areas.

The correspondence between the input switches and memory areas in the RAM 2 is as follows:

| | |
|---|---|
| Number of sheet set switch 70 | Number of sheet set area 92 |
| Position set switch 71 | Position set area 94 |
| Zone set switch 72 | Zone set area 95 |
| Resolution set switch 73 | Resolution set area 93 |

If N in step S25, the flow advances to step S27 to check if the scanner registration switch 75 is operated. If Y in step S27, a set value updated in step S26 is stored in the corresponding area of the scanner set area 97, and is displayed on the numerical display 65 for a predetermined period of time, in step S28. In step S29, the updated data is sent to the scanner 200, and the flow returns to the main routine. At this time, the update flag is reset.

If N in step S27, the flow advances to step S30 to check if the host registration switch 76 is operated. If Y in step S30, the flow advances to step S31, and the same processing as in step S28 is executed, so that data updated in step S26 is stored in the host set area 96 and is displayed on the numerical display 65. Then, the flow returns to the main routine. If N in step S30, it is checked in step S32 if the start switch 68 is operated. If Y in step S32, the start process shown in FIG. 11 (to be described later) is executed in step S33, and the flow returns to the main routine.

If N in step S32, the flow advances to step S40 to check if the ten keys 81 are operated. If Y in step S40, the flow advances to step S41, and input data is stored in the key buffer 91. In step S42, the input data is displayed on the numerical display 65 and the flow returns to the main routine. In this case, if the clear key is operated, the storage data in the key buffer 91 is cleared, and the flow returns to the main routine. If N in step S40, processing corresponding to the input key switch is executed in step S43, and the flow then returns to the main routine.

Figure 10:
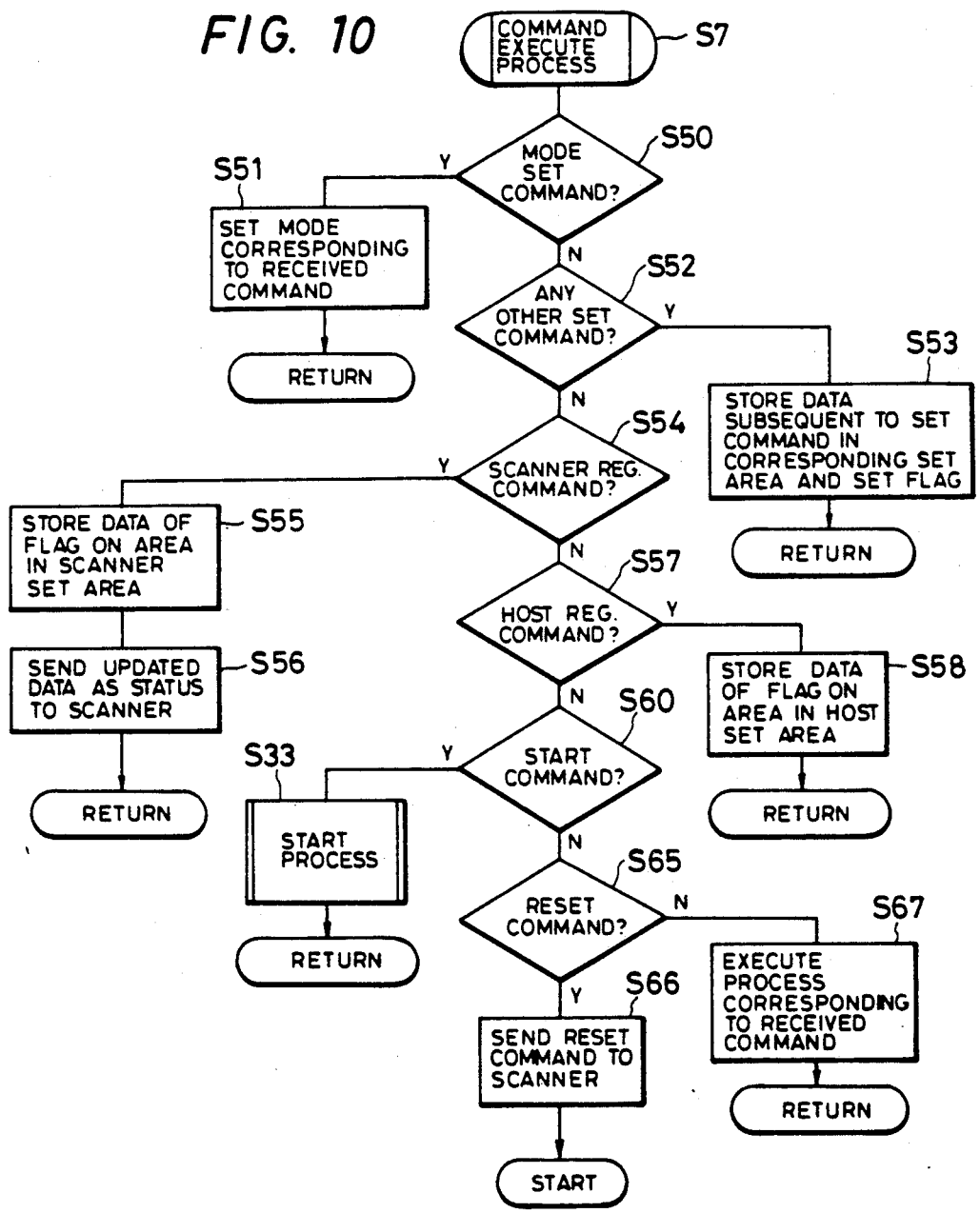

The command execution process in step S7 shown in FIG. 8 will be described with reference to the flow chart shown in FIG. 10.

If a command from the data processor is received in the on-line mode, it is checked in step S50 if a mode set command for setting the memory mode, the copy mode, the print mode, the MIX mode, or the transfer mode is input. If Y in step S50, the flow advances to step S51, and the mode corresponding to the received mode set command is set. After the corresponding mode is set, the flow returns to the main routine. Note that if no image memory 13 is additionally mounted, an error is alarmed with out setting the memory mode.

If N in step S50, the flow advances to step S52 to check if a set command for setting the number of sheets to be printed out, the position of image data, a zone of image data, or a resolution of image data to be transmitted is received. If Y in step S52, the flow advances to step S53, and a set value sent together with the command is stored in the corresponding area in the RAM 2. Then, the update flag is set, and the flow returns to the main routine.

The correspondence between the set commands and the set value memory areas is as follows:

| | |
|---|---|
| Number of sheet set command | Number of sheet set area 92 |
| Position set command | Position set area 94 |
| Zone set command | Zone set area 95 |
| Resolution set command | Resolution set area 93 |

If N in step S52, the flow advances to step S54 to check if a scanner registration command is received. If Y in step S54, the flow advances to step S55 and the set value updated in step S53 is stored in the corresponding area of the scanner set area 97. In step S56, the updated data is sent to the scanner 200, and the flow returns to the main routine. At this time, the update flag is reset.

If N in step S54, the flow advances to step S57 to check if a host registration command is received. If Y in step S57, the flow advances to step S58, and data updated in step S53 is stored in the host set area 96. Then, the flow returns to the main routine.

If N in step S57, it is checked in step S60 if a start command is received. If Y in step S60, the start process shown in FIG. 11 (to be described later) is executed in step S33, and the flow returns to the main routine.

If N in step S60, the flow advances to step S65 to check if a reset command is received. If Y in step S65, the flow advances to step S66, and the reset command is set to the scanner 200. If the scanner 200 cannot receive the reset command, a reset signal is output to the scanner 200, and the flow returns to step S1 in FIG. 8, thereby executing the initial process. In this embodiment, when the data processor can simply send the reset command to the image data output apparatus 100, the scanner can be initialized.

If N in step S65, the flow advances to step S67, and processing corresponding to received command is executed. The flow then returns to the main routine.

Figure 11:
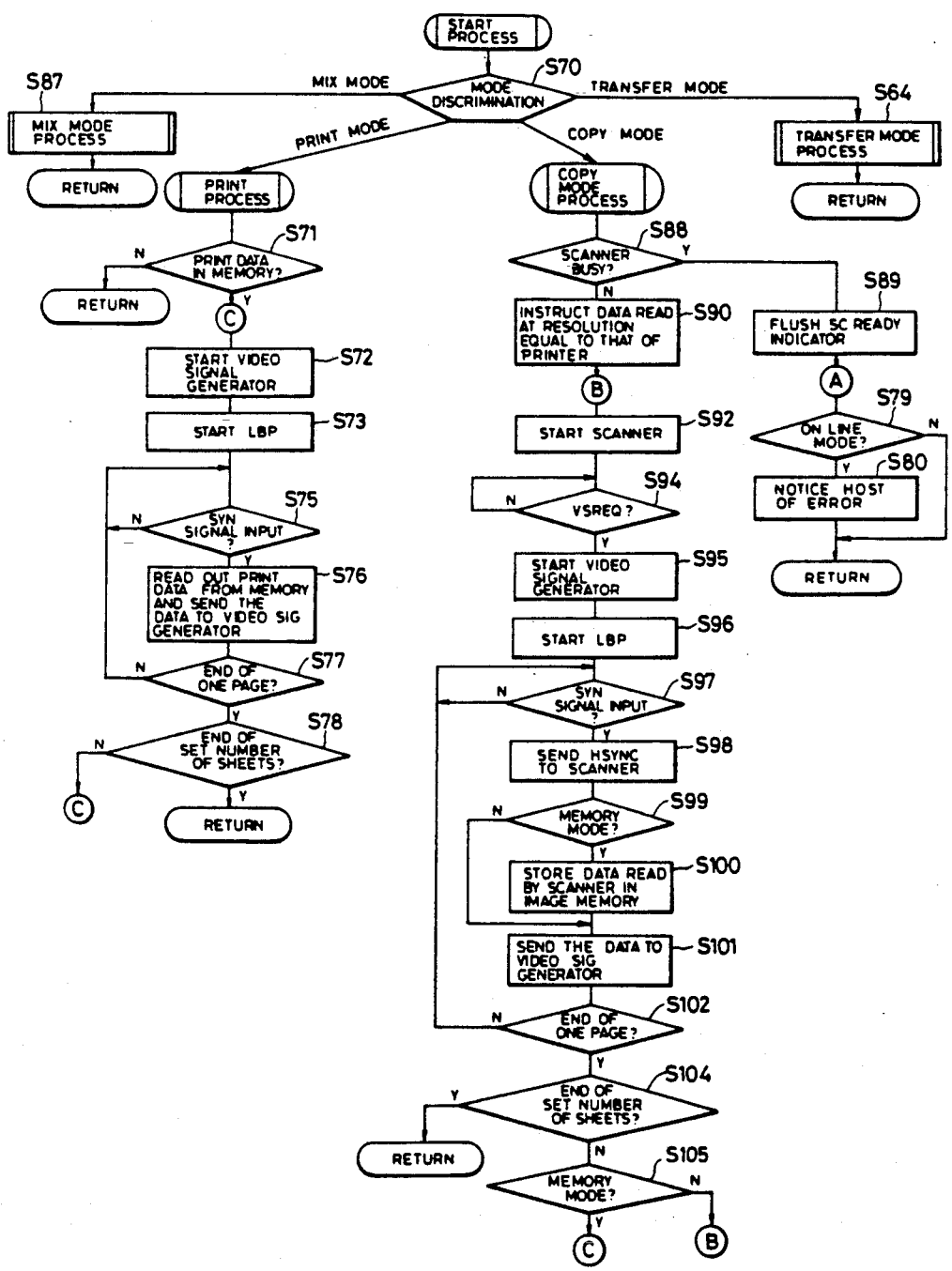

The start process in step S33 will be described with reference to the flow chart shown in FIG. 11.

A current mode is checked in step S70. If the transfer mode is set, the transfer process shown in FIG. 13 (to be described later) is executed in step S64, and the flow returns to the main routine. If the print mode is set, the print process in step S71 and thereafter is executed. If the MIX mode is set, the MIX mode process shown in FIGS. 12A and 12B (to be described later) is executed in step S87, and the flow returns to the main routine. If the copy mode is set, the copy mode process in step S88 and thereafter is executed.

If the print mode is detected in step S70, the flow advances to step S71 to check if print data is stored in the text area 98 of the memory. If Y in step S71, the video signal generator 8 is enabled in step S72, and the LBP engine unit 9 is enabled in step S73. The LBP engine unit 9 conveys a recording sheet to the position of the photosensitive body 28, thereby preparing for the recording operation. If the recording operation is prepared to be capable of receiving the recording data, a BD signal for requesting 1-line data transmission by means of laser beams is sent to the LBP interface 7. It is checked in step S75 if the BD signal as a data transfer sync signal is sent. If Y in step S75, 1-line print data is read out from the text area 98 in step S76, and is sent to the video signal generator 8 at a predetermined timing.

In this case, if the print data is character code data, the character code data is supplied to the character generator 11, so that it is converted to the corresponding character pattern and is developed by the pattern developer 12. The print data for each line is read out from the pattern developer 12, and is supplied to the video signal generator 8.

The video signal generator 8 sequentially outputs the print data to driver circuit 61 through the selector A 53, the selector B 54, and the selector C 60, respectively, thereby driving the semiconductor laser. When the image data for one line is printed out in this manner, it is checked in step S77 if the print operation for one page is completed. If N in step S77, the flow returns to step S75, and data for the next one line is printed.

If Y in step S77, the flow advances to step S78 to check if the print operations corresponding to the set number of sheets are completed. If Y in step S78, the flow returns to the main routine. However, if N in step S78, the flow returns to step S72, and the next print operation is executed.

If it is determined in step S71 that no print data is stored in the memory, the flow returns to the main routine without any processing.

If the copy mode is detected in step S70, the copy mode process in step S88 and thereafter is executed. It is checked in step S88 if the BUSY signal 202 from the scanner 200 is ON, i.e., if the scanner 200 is busy. If Y in S88, the copy mode cannot be set, and the SC READY indicator 84 flashes in step S89. The flow then advances to step S79 to check if the on-line mode is set. If N in step S79, the flow returns to the main routine. If Y in step S79, an error is informed to the data processor, and the flow returns to the main routine.

If N in step S88, the flow advances to step S90, and the scan resolution of the scanner 200 is set to be equal to that of the printer. If the resolution of the printer is lower than the maximum resolution of the scanner 200, read data from the CCD 21 is selectively output in correspondence with the resolution, and the sub-scan operation in the sub-scan direction is also performed in correspondence with the resolution. In step S92, the scanner 200 is enabled. The scanner 200 then prepares for an original surface scan operation. When this preparation is completed, the VSREQ signal 203 is output. Thus, it is checked in step S94 if the VSREQ signal 203 is output from the scanner 200. If the read preparation of the scanner 200 is completed and the VSREQ signal 203 is output, the flow advances from step S94 to step S95, and the video signal generator 8 is enabled. In step S96, the LBP engine unit 9 is enabled. It is checked in step S97 if the BD signal as the data transfer request timing signal is set from the LBP engine unit 9. If Y in step S97, the flow advances to step S98, and the HSYNC signal 205 is sent to the scanner 200 so as to request to scan and output data for one line (for single main scan operation).

Since the scanner 200 sends the multi-level digital image data for one line in response to this, it is checked in step S99 if the memory mode is set. If Y in step S99, the image data sent from the scanner 200 is stored in the image memory 13 in step S100, and the flow then advances to step S101. If N in step S99, the flow also advances to step S101, and the image data from the scanner 200 is output to the video signal generator 8. The video signal generator 8 executes the following processing directly if the output timing of the printer is synchronized with the data send timing of the scanner 200 or after the image data is temporarily stored in the 1-line buffer 51 if synchronization cannot be achieved. The image data selected by the selector A 53 is sequentially and selectively output to the driver circuit 61 through the selector C 60, thereby driving the semiconductor laser. When the image data for one line is printed out in this manner, it is checked in step S102 if the print operation for one page is completed. If N in step S102, the flow returns to step S97, and the print process for the next 1-line data is executed.

If Y in step S102, the flow advances to step S104 to check if the print operations corresponding to the set number of sheets are completed. If Y in step S104, the processing is ended, and the flow returns to the main routine. If N in step S104, it is checked in step S105 if the memory mode is set. If Y in step S105, the next print operation can be performed while reading out image data from the memory, and the print process in step S72 and thereafter is executed. If N in step S105, the flow returns to step S92.

The MIX mode process in step S87 will be described with reference to FIGS. 12A and 12B.

It is checked in step S130 if the LBP engine unit 9 is ready. If N in step S130, the print process cannot be executed, and it is checked in step S131 if the on-line mode is set. If Y in step S131, the flow advances to step S132 to inform an error to the data processor. The flow then returns to the main routine. If N in step S131, the processing is interrupted, and the flow returns to the main routine.

If Y in step S130, the flow advances to step S133 to check if the scanner 200 is ready. If N in step S133, the MIX mode process cannot be executed, and the flow advances to step S131.

If Y in step S130, it is checked in step S134 if the memory mode is set. If Y in step S134, image data scan processing from the scanner 200 is executed in step S136 and thereafter. In step S136, an enable instruction is output from the scanner interface 10 to the scanner 200 through the control bus 206. The scanner 200 prepares for the original surface scan operation in response to this, and if this preparation is completed, outputs the VSREQ signal 203. Thus, it is checked in step S137 if the VSREQ signal 203 is output from the scanner 200. If Y in step S137, the flow advances to step S138, and the HSYNC signal 205 is output to the scanner 200. Since the scanner 200 subsequently sends the multi-level digital image data for one line, the CPU 1 stores the sent data in the image memory 13 in step S139.

After the data for one line is stored, it is checked in step S140 if the data for one page is stored. If N in step S140, the flow returns to step S137.

If Y in step S140, the flow advances to step S145, and the video signal generator 8 is enabled. In step S146, the LBP engine unit 9 is enabled in the same manner as in step S73. It is checked in step S148 if the BD signal is sent. If Y in step S148, the flow advances to step S149, and print data for one line is read out from the text area 98, and is sent to the video signal generator 8 at a predetermined timing.

In this case, if the print data is character code data, the character code data is sent to the character generator 11, is converted to the corresponding character pattern, and is developed by the pattern developer 12. The print data for one line is read out from the pattern developer 12, and is sent to the video signal generator 8.

The selector A 53 in the video signal generator 8 selectively outputs the image data in accordance with a position or zone instructed by the scanner set area 97 so as to convert it into a pulse-width modulated drive signal corresponding to multi-gray scale level data. Then, the drive signal is output to the OR gate 59.

The selector B 54 selectively outputs text data to the OR gate 59 in accordance with a position or zone instructed by the host set area 96 to the OR gate 59. The OR gate 59 mixes input data, and output the mixed data to the selector C 60. The selector C 60 is controlled by the controller 50 to select the data from the OR gate 59 in the MIX mode upon instruction from the CPU 1. The mixed data is sequentially and selectively output to the driver circuit 61 to drive the semiconductor laser. Thus, the mixed data for one line (in the main scan direction) is printed out.

After the image data for one line is printed out in this manner, it is checked in step S150 if the print operation for one page is completed. If N in step S150, the flow returns to step S148, and data for the next one line is printed.

If Y in step S150, the flow advances to step S151 to check if the print operations corresponding to the set number of sheets are completed. If Y in step S151, the processing is ended, and the flow returns to the main routine. If N in step S151, the flow returns to step S145, and the next print operation is executed.

Figure 12A:
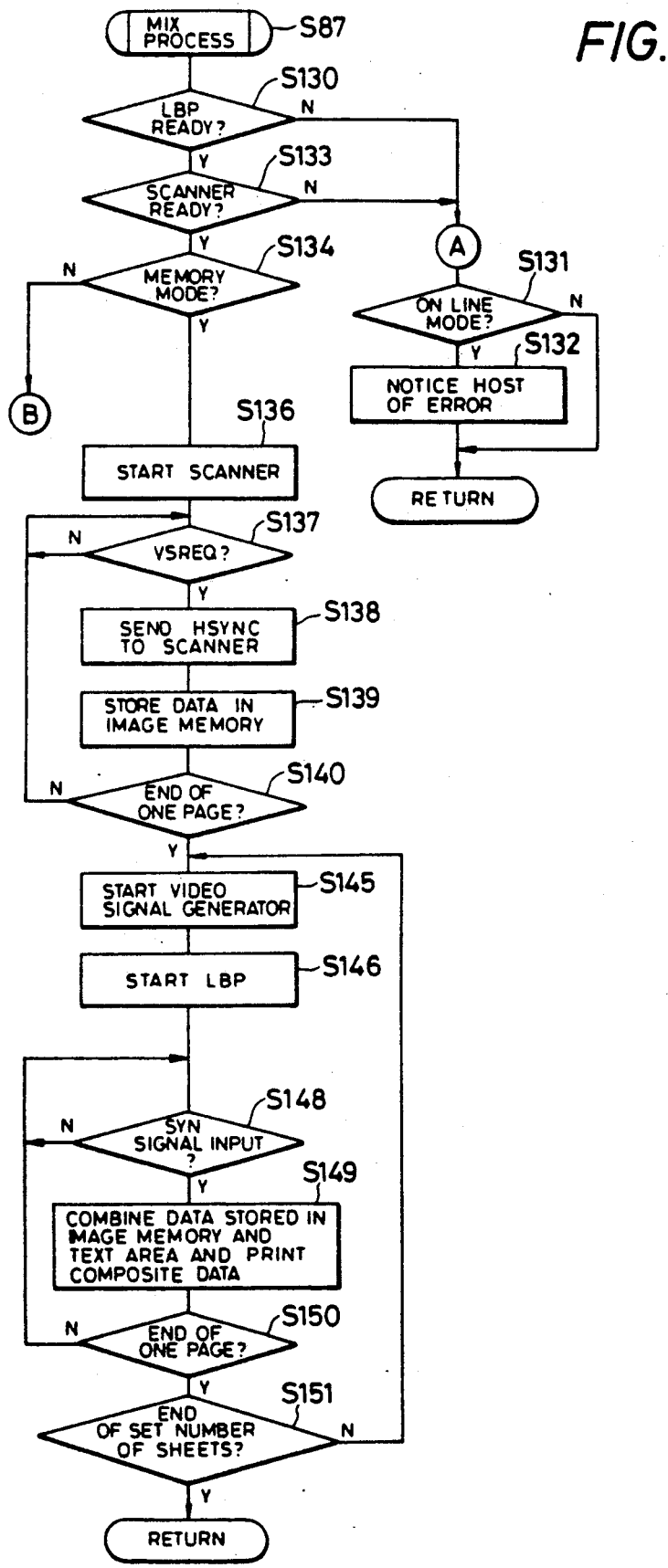
Figure 12B:
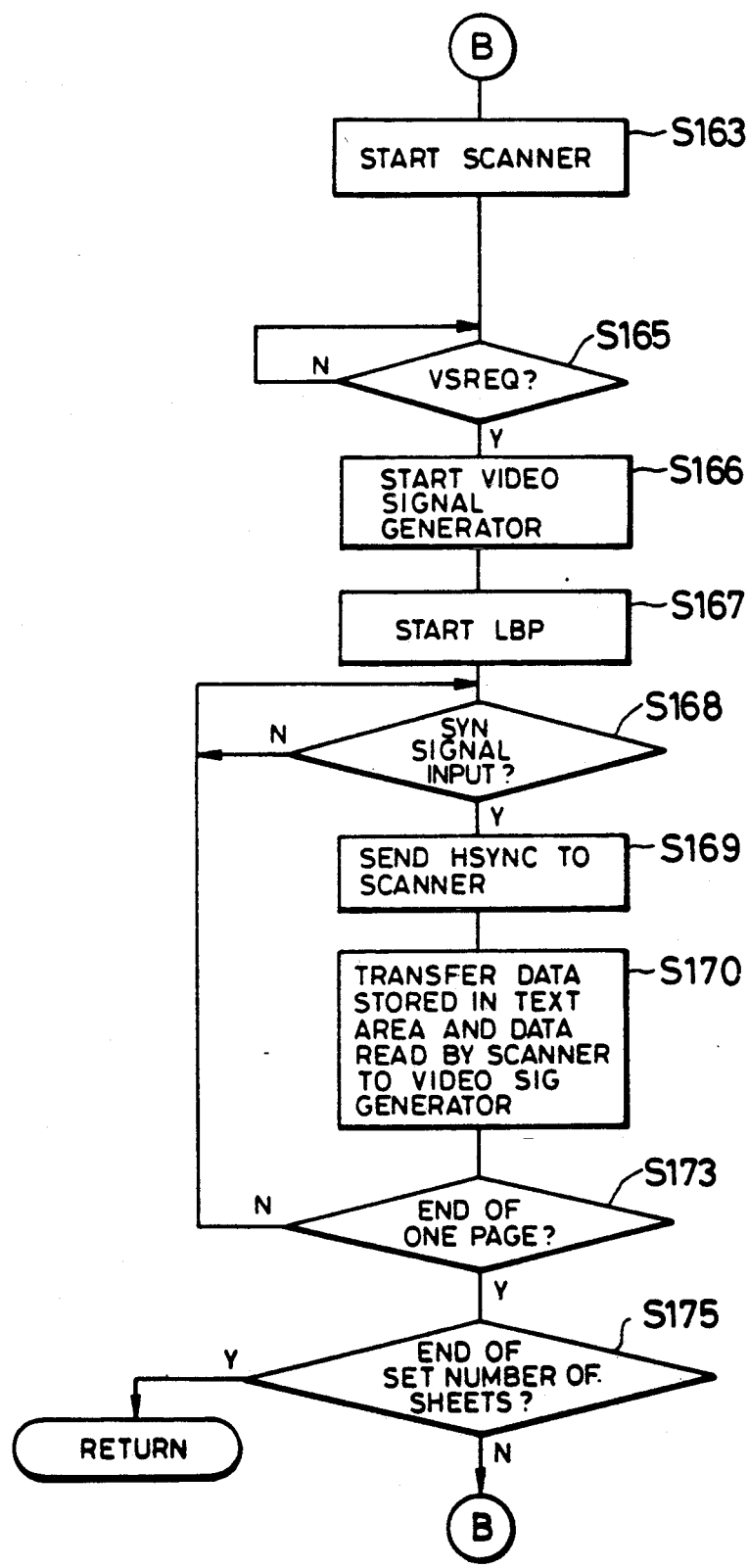

If N in step S134, the flow advances to step S163 and thereafter, as shown in FIG. 12B. In steps S163 to S169, the LBP engine unit 9 is enabled through the same processing as in steps S92 to S98 in FIG. 11, and image data for one line is read from the scanner 200. In step S170, text data in the text area 98 and image data from the scanner 200 are transferred to the video signal generator 8. The video signal generator 8 converts the transferred data into a semiconductor laser drive signal, and the LBP engine unit 9 prints out data for one line in accordance with the drive signal.

After the print operation for one line is completed in this manner, it is checked in step S173 if the print operation for one page is completed. If N in step S173, the flow returns to step S168, and the MIX mode process for data of the next one line is executed.

If Y in step S173, the flow advances to step S175 to check if the print operations corresponding to the set number of sheets are completed. If Y in step S175, the processing is ended, and the flow returns to the main routine. If N in step S175, the flow returns to step S163.

Figure 13:
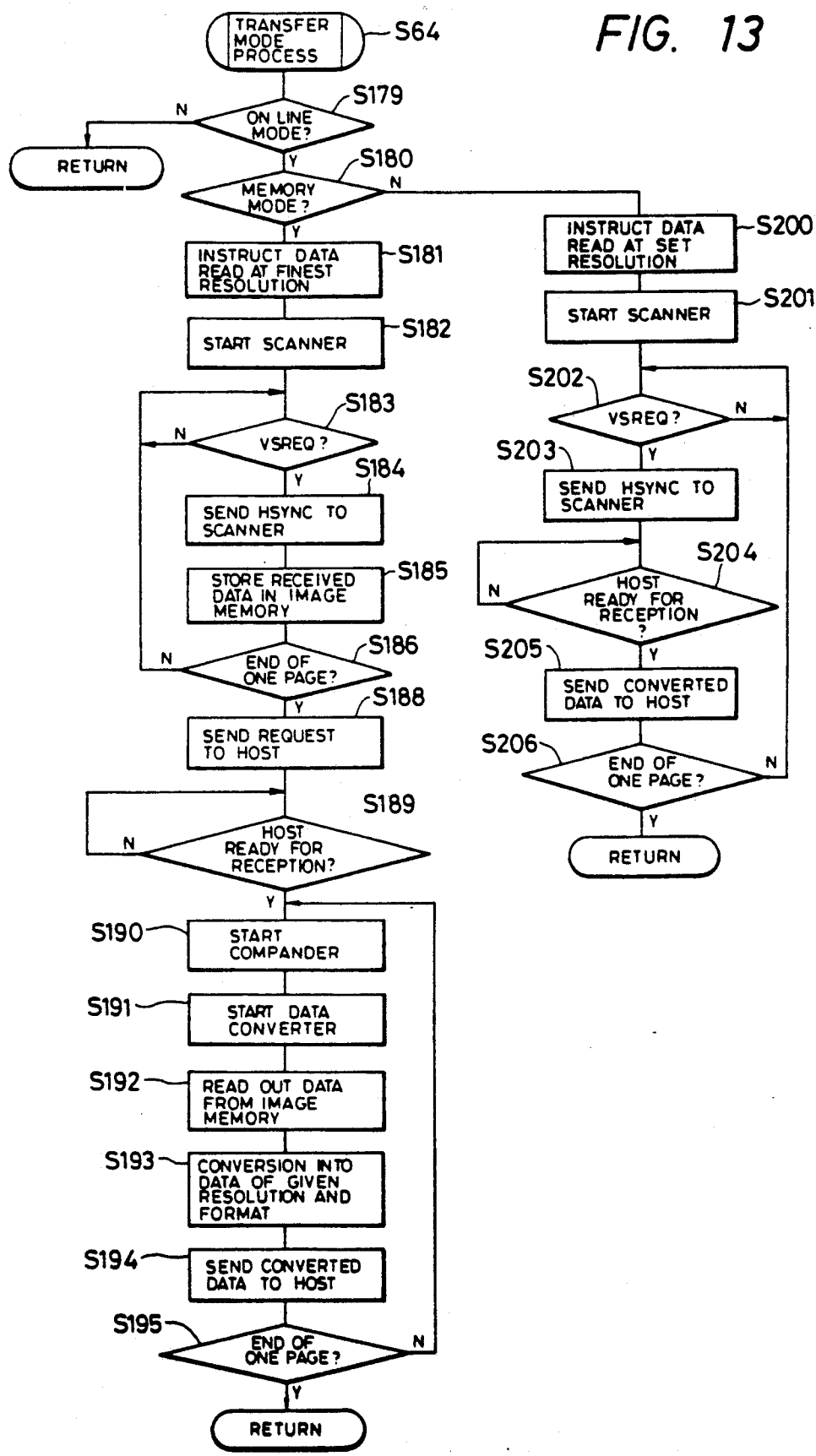

The transfer process in step S64 will be described with reference to the flow chart shown in FIG. 13.

It is checked in step S179 if the on-line mode is set. If N in step S179, the flow immediately returns to the main routine. If Y in step S179, the flow advances to step S180 to check if the memory mode is set. If Y in step S180, the flow advances to step S181, and the CPU 1 instructs the image data read operation at the finest resolution to the scanner 200. In steps S182 to S186, data for one page is read from the scanner 200 through the same processing as in steps S136 to S140, and is stored in the image memory 13.

After the image data for one page is read, a transmission request is sent to the data processor in step S188. The transmission request is output to the data processor as a command through the serial interface 4, or is output thereto as a request signal through the parallel interface 6. The CPU 1 awaits in step S189 until the data processor completes preparation for reception. If Y is obtained in step S189, the flow advances to step S190, and the compander 16 is enabled. In step S191, the data converter 17 is enabled. In step S192, the image data is read out from the image memory 13, and is converted to data having a resolution and data format designated by the host set area 96. In step S194, the converted data is sent to the data processor.

More specifically, image data to be processed by the data processor often has a lower resolution than the scan resolution of the scanner 200, and is not multi-level (or multi-value) gradation data. Mostly the data is dither-processed data or binary data. In this embodiment, if multi-level (or multi-value) data is sent in such a case, this undesirably delays processing. Therefore, in the memory mode, data to be sent to the data processor is converted to data having a data format corresponding to that of the data processor by the image data output apparatus 100, and the converted data is output to the data processor.

In this case, in addition to resolution conversion of data, multi-level (or multi-value) 6-bit multi-gradation image data from the scanner 200 is compressed/expanded by known data compression/expansion processing by the compander 16, and the multi-level (or multivalue) data is converted to dither-processed binary data by the data converter 17. The binary data is sent to the data processor. Thus, desired image data can be transferred in a short data transfer time.

If data transfer to the data processor is completed in step S194, it is checked in step S195 if data transfer for one page is completed. If Y in step S195, the processing is ended, and the flow returns to the main routine. If N in step S195, the flow returns to step S190, and the next image data is transferred.

Meanwhile, if N in step S180, the flow advances to step S200, and the CPU 1 causes the scanner 200 to scan image data at a resolution instructed by the host set area 96. In this manner, scanned image data at a desired resolution is sent from the scanner 200 at a predetermined timing. Therefore, in step S201 to S203, data for one line is scanned by the scanner 200 in the same manner as in steps S182 to S184, and the CPU 1 awaits until the data processor completes preparation for data reception, in step S204. If Y is obtained in step S204, the received data is sent to the data processor in step S205. It is checked in step S206 if data for one page is transferred. If Y in step S206, the processing is ended, and the flow returns to the main routine. If N in step S206, the flow returns to step S202.

According to this embodiment, the image data output apparatus can control the image data scanning apparatus. Thus, a processing load on the host computer can be reduced, and the print process at high resolution can be executed without arranging a processor having a data resolution exceeding that of the host computer.

According to this embodiment, data received from the image data scanning apparatus is output in correspondence with the interface standards with the data processor. Therefore, data from an image data scanning apparatus of any standard can be output through an interface matching with the data processor without applying a special load on the data processor.

In the above description, the interface with the scanner 200 has been described. However, this embodiment is not limited to this, and the apparatus of this embodiment can be connected to interfaces of other standards. For example, if the scanner 200 has the same Centronics interface standard as that of the printer, an interface circuit having the same arrangement as that of the parallel interface 6 can be arranged as the scanner interface 10, and can be controlled accordingly.

A second embodiment of the present invention will now be described.

The difference between the first and second embodiments is as follows. Image data transfer processing is performed in accordance with a command send from the data processor. Therefore, the difference between the first and second embodiments will be described hereinafter with reference to FIGS. 13, 14, and 15. Note that the drawings other than FIGS. 6 and 10 can be commonly used, and a description thereof will be omitted. The same reference numerals in FIGS. 14 and 15 denote the same functional blocks as in FIGS. 6 and 10.

Figure 14:
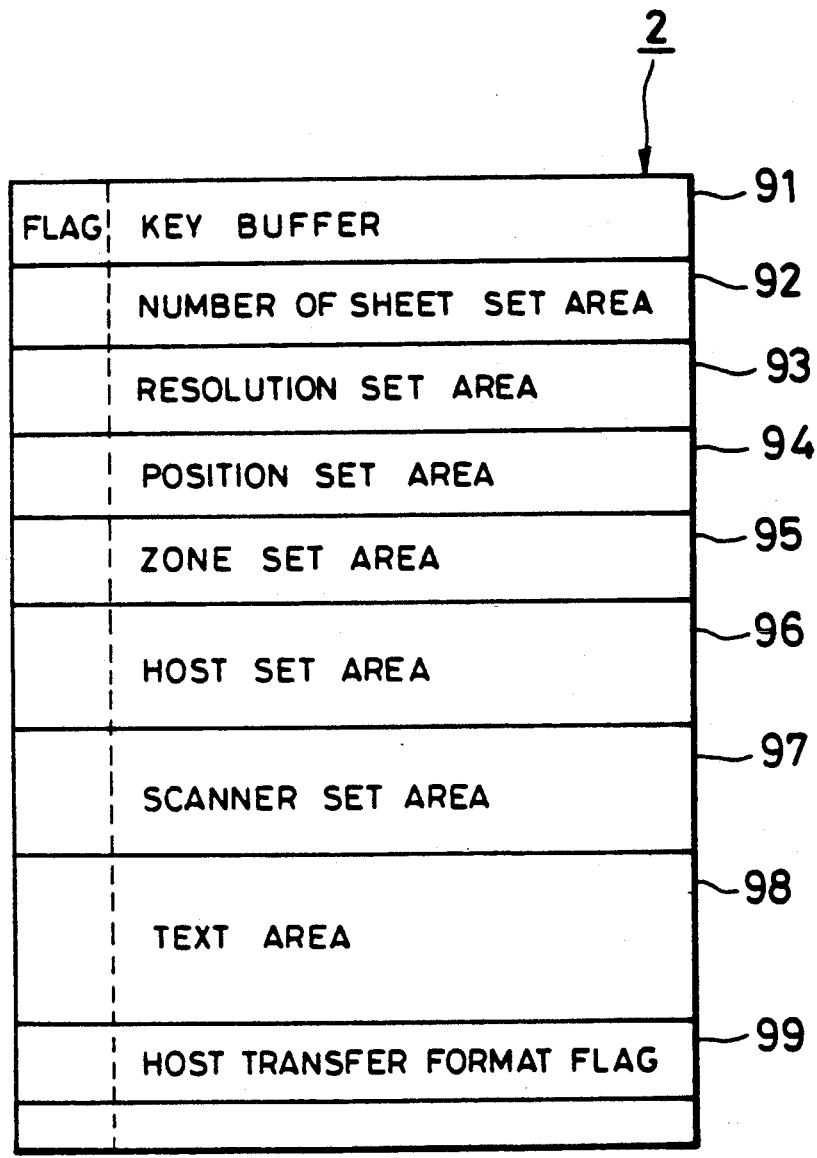
FIG. 14 is a detailed memory map of a RAM according to a second embodiment of the present invention.
Figure 15:
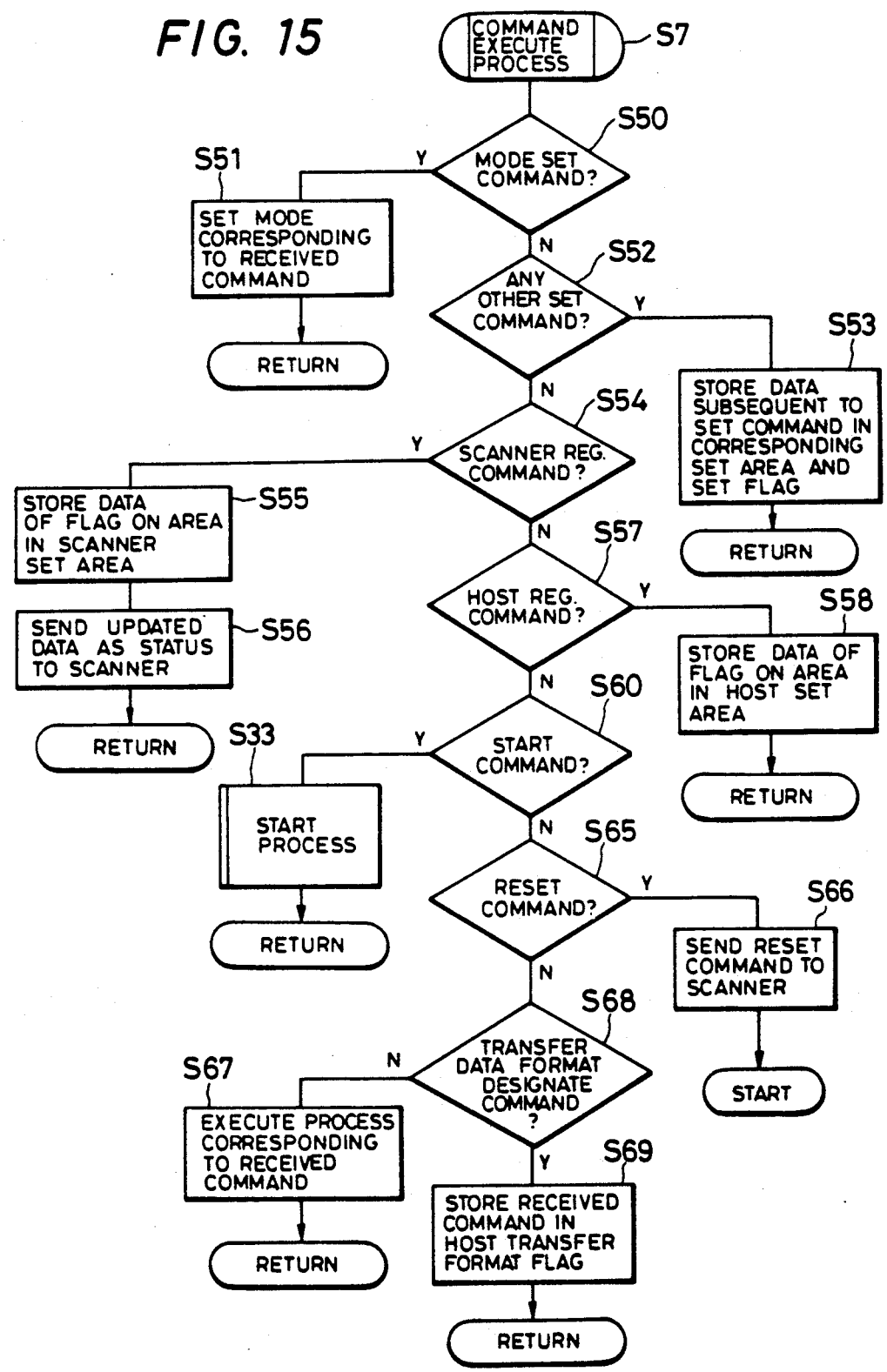
FIG. 15 is a control flow chart of the second embodiment.

FIG. 14 is a memory map of the RAM 2 of the second embodiment. The difference from FIG. 6 of the first embodiment is that a host transfer format flag 99 for storing a transfer data format set command is additionally provided. The operation of the second embodiment will now be described with reference to FIGS. 13 and 15. In FIG. 15, steps S7, S33, S50 to S58, S60, and S65 to S67 are the same as those in FIG. 10, and a description thereof is omitted.

In FIG. 15, if no reset command is received in step S65, the flow advances to step S68 to check if a transfer data format set command for setting a data format upon transfer of image data to the data processor is received. If Y in step S68, the transfer data format set command received in step S69 is stored in the host transfer format flag 99, and the flow returns to the main routine. If N in step S68, the flow advances to step S67, and processing corresponding to a received command is executed. The flow then returns to the main routine.

The operation of the second embodiment will now be described with reference to FIG. 13. In the second embodiment, the contents of steps S193 and S200 are different from those in the first embodiment, and steps S193 and S200, and steps associated therewith will be described below. In step S189, the CPU 1 awaits until the data processor prepares for reception. If Y is obtained in step S189, the flow advances to step S190, and the compander 16 is enabled. In step S191, the data converter 17 is enabled. In step S192, image data is read out from the image memory 13, and in step S193, the read data is converted to data having a resolution and a data format set by the host transfer format flag 99. In step S194, the converted data is transferred to the data processor.

More specifically, image data to be processed by the data processor often has a lower resolution than the scan resolution of the scanner 200, and is not multi-level gradation data. Such data is often dither-processed data or binary data. In this embodiment, if multi-level data is transferred in such a case, this undesirably delays processing. In the memory mode, the image data output apparatus 100 converts the scanned image data into data having a format set by the transfer data format set command in correspondence with the processing format of the data processor, and then outputs the converted data.

If the data processor instructs to convert scanned image data to binary data, 6-bit multi-level multi-gradation image data from the scanner 200 is binarized by the data converter 17 such that if the gray scale level of the data exceeds a predetermined threshold value, the corresponding pixel is ON; otherwise, it is OFF.

The compander 16 performs known compression/expansion processing in accordance with the resolution and compression set by the data processor. More specifically, when 4×4 dot image data is converted to 1-dot data in accordance with the set resolution, the 4×4 dot image data is used as one unit, so that an average value of data in one unit is calculated. If the average value exceeds the predetermined threshold value, the corresponding pixel is ON; otherwise, is OFF, thereby producing new image data.

This embodiment is not limited to this. Image data in the main scan direction and the subscan direction of the image data can be selectively compressed at a predetermined rate, or image data can be compressed by a known method, e.g., a dither method.

Image data is converted to data having a resolution set by the data processor in this manner, and is sent to the data processor in step S194. Desired image data can be transferred to the data processor in a short data transfer time.

If data transfer to the data processor is completed in step S194, it is checked in step S195 if data transfer for one page is completed. If Y in step S195, the processing is ended, and the flow returns to the main routine. If N in step S195, the flow returns to step S190, and the next image data is transferred.

If it is detected in step S180 that the memory mode is not set, the flow advances to step S200, and the CPU 1 causes the scanner 200 to scan image data at a resolution set by the host transfer format flag 99. Thereafter, scanned image data of a desired resolution is sent from the scanner 200 at a predetermined timing. Therefore, in steps S201 to S203, data for one line is scanned in the same manner as in steps S182 to S184. In step S204, the CPU 1 awaits until the data processor prepares for data reception. If Y is obtained in step S204, the reception data is sent to the data processor in step S205. It is checked in step S206 if data transfer for one page is completed. If Y in step S206, the processing is ended, and the flow returns to the main routine. If N in step S206, the flow returns to step S203.

According to this embodiment as described above, the image data output apparatus can control the image data scanning apparatus. Therefore, a processing load on the host computer can be reduced, and scanned image data can be transferred in a data format set by the host computer. In this manner, image data processing can be executed without arranging a processor having a data resolution exceeding that of the host computer, and print processing can be executed at a high resolution.

A third embodiment of the present invention will now be described.

The difference between the first and third embodiment is that a density of a reproduced image can be changed. Therefore, only a difference from the first embodiment will be principally described with reference to FIG. 16. Since the drawings other than FIG. 4 can be commonly used, a detailed description thereof will be omitted. The same reference numerals in FIG. 16 denote the same functional blocks as in FIG. 4.

Figure 16:
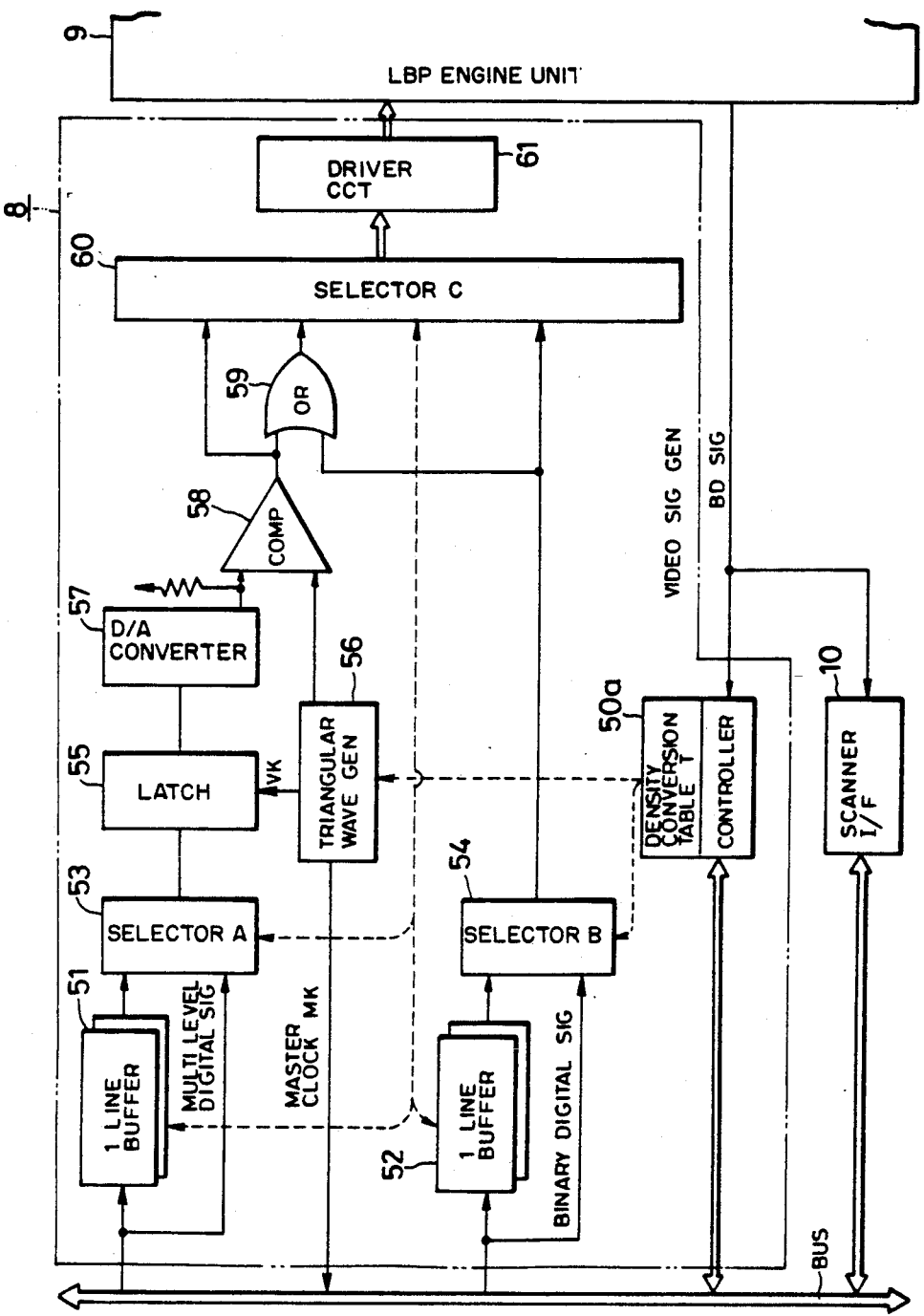
FIG. 16 is a detailed block diagram of a video signal generator according to a third embodiment of the present invention.

FIG. 16 shows the detailed arrangement of a video signal generator 8 for producing a video signal for driving the semiconductor laser in an LBP engine unit 9.

Referring to FIG. 16, a controller 50a for performing the overall timing control such as output selection of selectors has a density conversion table T, and changes a generation pattern of a triangular wave as a pattern signal generated from a triangular wave generator 56 in accordance with an output density of binary digital data. In addition, the controller 50a changes the output density of multi-level image data output from a comparator 58. Line buffers 51 and 52 are of a double buffer type, each being composed of two line buffers each having a storage capacity corresponding to one line. The line buffer 51 is a line buffer of 6-bit parallel double buffer type, and the line buffer 52 is a line buffer of a 1-bit binary image signal double line buffer type. Selectors A 53 and B 54 select whether an input image signal is output with or without being through the line buffers 51 and 52. A latch 55 latches a multi-level digital image signal. The triangular wave generator 56 produces a triangular wave having a given pattern under the control of the controller 50a. A D/A converter 57 digital-to-analog converts a latched digital data into an analog signal corresponding thereto. The output from the D/A converter 57 is connected to one input terminal of the comparator 58. An OR gate 59 mixes a pulse-width modulated signal from the comparator 58 and a binary signal from the selector B 54. A selector C 60 selects one of the output signals from the comparator 58, the selector B 54, and the OR gate 59 and outputs the selected signal as a video signal. A driver circuit 61 converts the video signal from the selector C 60 into a drive signal for driving the semiconductor laser in the LBP engine unit 9. Note that an LBP interface is arranged between the video signal generator 8 and the LBP engine unit 9 but is omitted from FIG. 16 for the sake of simplicity.

In the video signal generator 8 of the third embodiment, when a multi-level digital image signal is converted to a binary semiconductor laser drive signal for image formation, the digital image signal is temporarily converted to an analog signal in order to obtain gradation, and the converted signal is compared with a pattern signal as a triangular wave, thereby generating a pulse-width modulated binary signal. When the pattern signal is changed, output density characteristics can be easily changed.

The multi-level digital image signal is latched by the latch 55 in response to a video clock VK for the purpose of synchronization. The video clock VK is obtained by $\frac{1}{2}$ frequency dividing a master clock MK by the triangular wave generator 56.

The output from the D/A converter 57 is converted to a voltage level by a resistor, and is then input to one input terminal of the comparator 58. The triangular wave generator 56 frequency divides the master clock MK at a predetermined frequency dividing ratio under the control of the controller 50a, thereby generating a clock signal having a duty ratio of 50%. The clock is converted to a triangular wave by an integrator consisting of a resistor and a capacitor and the integrator outputs the triangular wave. The triangular wave is input to the other input terminal of the comparator 58, is compared with the analog signal from the D/A converter 57, and is pulse-width modulated.

In order to change an output signal level from the comparator 58, conversion characteristics (sensitivity characteristic, and the like) in the D/A converter 57 can be changed upon instruction from the controller 50a, thereby changing an output level, instead of the above-mentioned method.

In the third embodiment, the MIX mode processing described with reference to FIGS. 12A and 12B is executed. In the third embodiment, the following operation is performed in order to improve the quality of a reproduced image.

The CPU 1 sends an output line pitch and a character pitch of character data to be printed, which are set by the data processor, to the controller 50a of the video signal generator 8. In addition, the CPU 1 discriminates the font pattern of the character, and sends the discriminated font pattern data to the controller 50a of the video signal generator 8, at the same time. The controller 50a discriminates an output density of a character pattern upon print out in accordance with the output line pitch and the character pitch of character data to be printed. The controller 50a instructs the triangular wave generator 56 to change the pulse-width modulated semiconductor laser drive signal output from the comparator 58 in accordance with the output density. This operation can be performed with reference to the conversion table incorporated in the controller 50a, such that several density levels are set whether the line pitch and the character pitch are larger or smaller than a predetermined threshold value, and as image data has a higher pattern denisty, the output density of the image data is decreased. Furthermore, if the font pattern corresponds to the Gothic, the controller 50a discriminates that character data has a high character pattern density, and decreases the output density by one more step. At a timing at which text data and image data are mixed, a triangular wave changing signal is output to the triangular wave generator 56 so as to output a triangular wave according to the set value. The triangular wave generator 56 changes an amplitude and an offset of the triangular wave based on the triangular wave changing signal so as to change the output image density.

Image data input to the selector A 53 in the video signal generator 8 is selectively output therefrom in accordance with a position and a zone set by the scanner set area 97, and is converted to the analog signal corresponding to the multi-level data by the D/A converter 57. Then, the analog signal is converted by the comparator 58 to the pulse-width modulated drive signal in accordance with the triangular wave signal from the triangular wave generator 56, and the drive signal is output to the OR gate 59.

A fourth embodiment of the present invention will now be described.

In the fourth embodiment, FIGS. 1, 2, 3, 4, 5, 7, and 8 can be used, and a description thereof is omitted. The same reference numerals in FIG. 17 denote the same functional blocks as in FIG. 6.

The image data output apparatus 100 shown in FIG. 1 includes the CPU (Central Processing Unit) 1 for controlling the overall apparatus in accordance with a control sequence shown in flow charts (to be described later) stored in the ROM (Read-Only Memory) 3, the RAM (Random Access Memory) 2 serving as a work area of the CPU 1, the parallel interface 6 for interfacing with the host computer 300 under the control of the CPU 1, the LBP interface 7 for interfacing with an LBP (Laser Beam Printer) engine unit 9 as the mechanism unit of the LBP, and the video signal generator 8 which selects pulse-width modulated image data obtained by PWM-modulating multi-gradation image data in accordance with gray scale levels or binary image signal, or mixes the PWM signal with the binary data, thereby generating a corresponding semiconductor laser drive video signal.

In FIG. 5, a switch 74 serves as a memory mode switch for setting the memory mode. In the memory mode, image data from the scanner 200 is registered with an identification (ID) number unique to the RAM 2. Note that the memory mode switch 74 is an illumination type switch, and is turned on when the memory mode is set.

Figure 17:
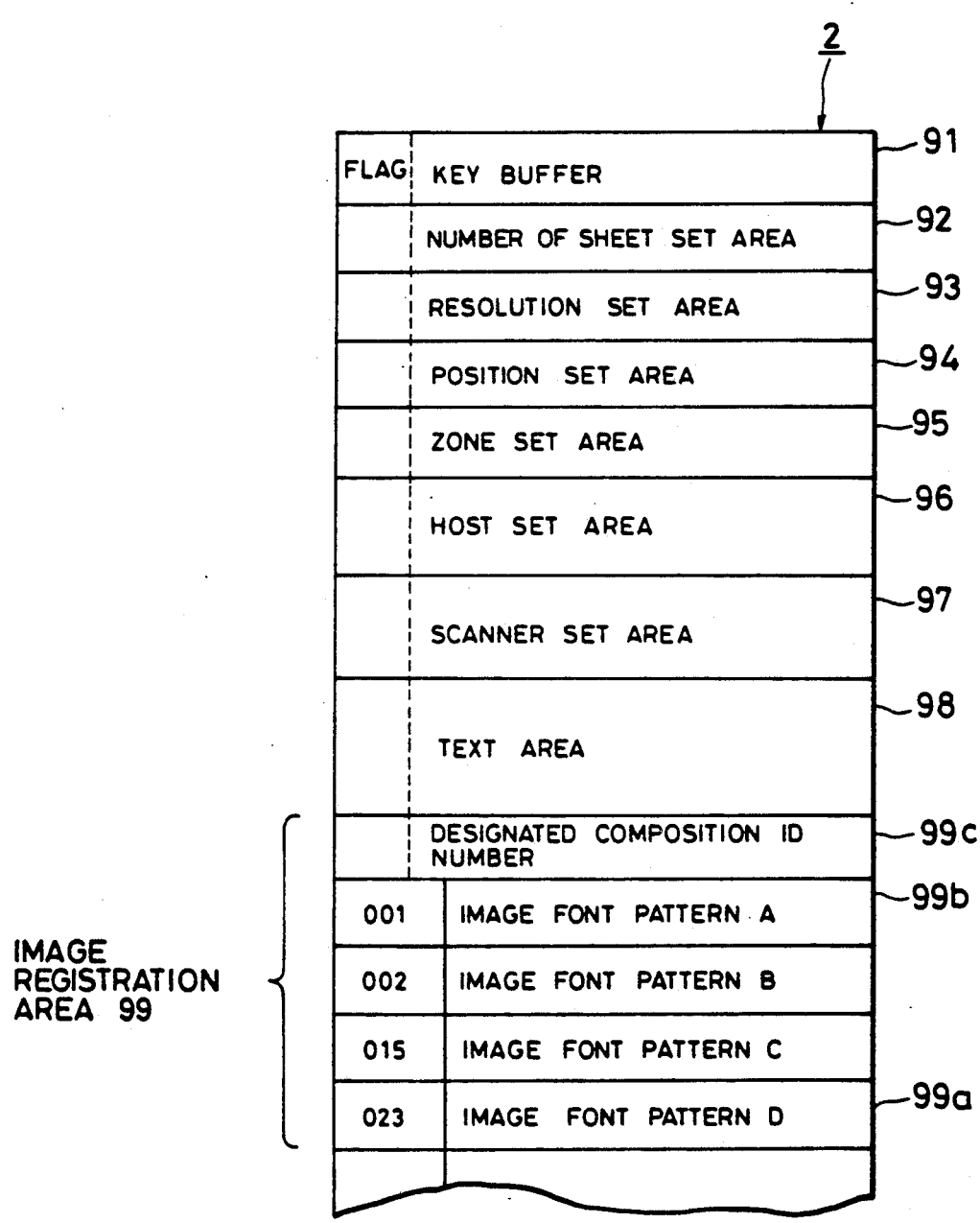
FIG. 17 is a detailed memory map of a RAM according to a fourth embodiment of the present invention.

FIG. 17 shows the memory map of the RAM 2 in the fourth embodiment. The difference from FIG. 6 of the first embodiment is that an image registration area 99 is additionally provided. The image registration area 99 stores an image pattern corresponding to an ID number registered in the memory mode. The image registration area 99 consists of an ID number memory area 99a, a registered image (image font pattern) memory area 99b and a designated composition ID number area 99c.

Figure 18:
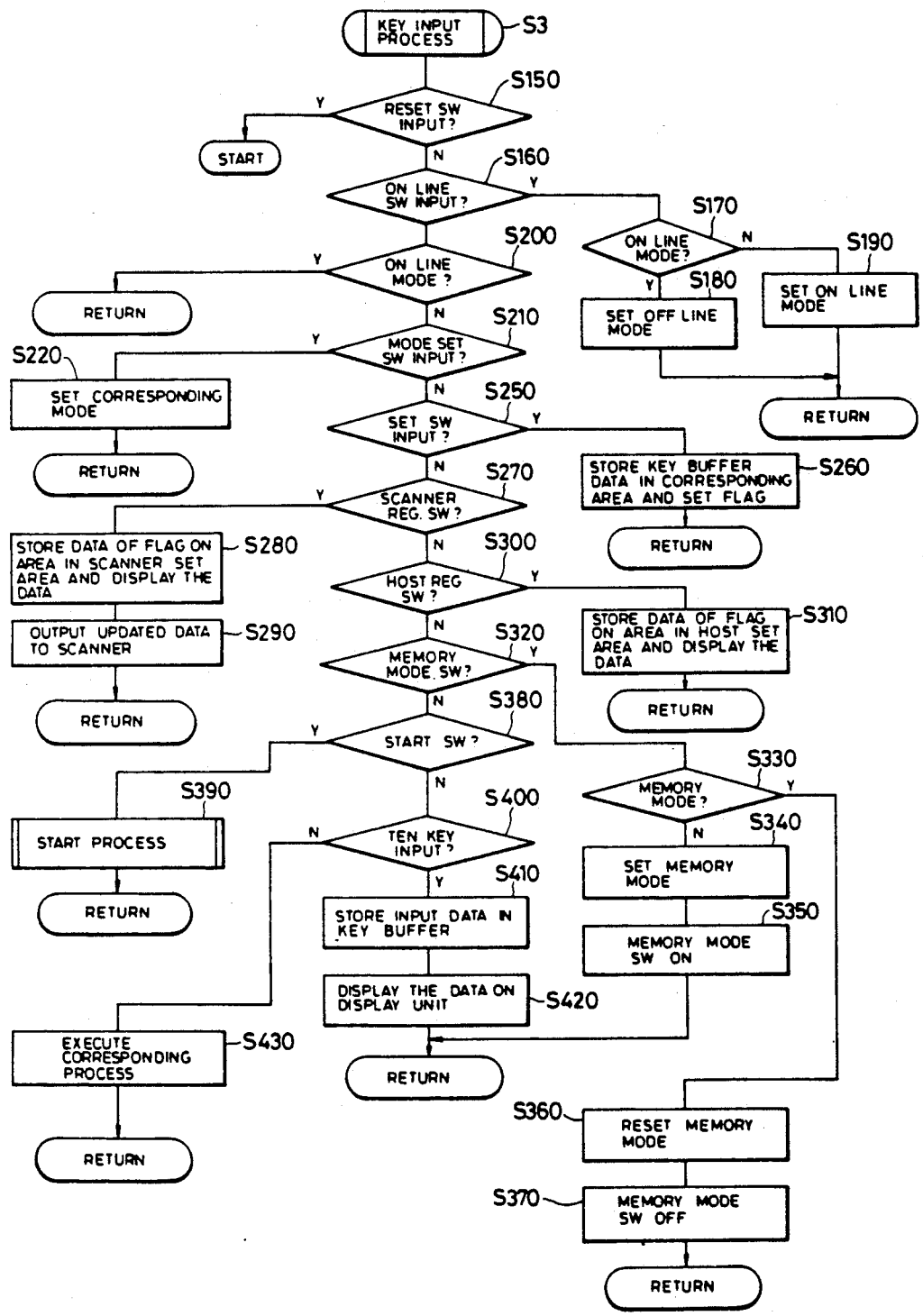
FIGS. 18 to 23 are control flow charts according to the fourth embodiment.

The key input process in the fourth embodiment will be described hereinafter with reference to the flow chart shown in FIG. 18.

If key input is performed, it is checked in step S150 if the reset switch 67 is operated. If Y in step S150, the flow returns to step S1 shown in FIG. 8, and the initial process is executed.

If N in step S150, the flow advances to step S160 to check if the on-line switch 66 is operated. If Y in step S160, the flow advances to step S170 to check if the on-line mode is set and the on-line switch 66 is turned on. If Y in step S170, the off-line mode is set in step S180, and the on-line switch 66 is turned off. The flow then returns to the main routine. If N in step S170, the on-line mode is set in step S190, and the flow returns to the main routine. In this case the on-line switch 66 is turned on.

If N in step S160, however, the flow advances to step S200 to check if the on-line mode is set. If Y in step S200, other operations are made invalid, and the flow returns to the main routine. If N in step S200, the flow advances to step S210 to check if the mode switches 77 to 80 are operated. If Y in step S210, the mode corresponding to the operated mode switch is set. After the corresponding mode is set, the flow returns to the main routine.

If the switches 74, 77 to 80 are not operated in step S210, the flow advances to step S250 to check if the set switches 70 to 73 are operated. If Y in step S250, the flow advances to step S260, and the storage data to the key buffer 91 upon switch input is stored in the corresponding area in the RAM 2 and the update flag is turned on. The flow then returns to the main routine. Note that if no data is stored in the key buffer 91 or if inappropriate data is stored therein, an input error can be signalled without updating areas. The correspondence between the input switches and memory areas in the RAM 2 is as follows:

| Position set switch 71 | Position set area 94 |
|---|---|
| Zone set switch 72 | Zone set area 95 |
| Resolution set switch 73 | Resolution set area 93 |
| Number of sheets set switch 70 | |
| In memory mode | Designated composition ID number area 99c |
| In other modes | Number of sheets set area 92 |

If N in step S250, the flow advances to step S270 to check if the scanner registration switch 75 is operated. If Y in step S270, the flow advanced to step S280 in which the set values updated in step S260 are stored in the corresponding areas in the scanner set area 97 and are sequentially displayed on the numerical display 65 for a predetermined period of time. In step S290, the updated data is sent to the scanner 200, and the flow returns to the main routine. In this case, the update flag is reset.

If N in step S270, the flow advances to step S300 to check if the host registration switch 76 is operated. If Y in step S300, the flow advances to step S310, and data updated in step S260 is stored in the host set area 96 in the same manner as in step S280 and is displayed on the numerical display 65. The flow then returns to the main routine. If N in step S300, the flow advances to step S320 to check if the memory mode switch 74 is operated. If Y in step S320, the flow advances to step S330 to check if the memory mode is set. If N in step S330, the memory mode is set in step S340, and the memory mode switch 74 is illuminated in step S350. The flow then returns to the main routine. If Y in step S330, the flow advances to step S360, and the memory mode is reset, and the memory mode switch 74 is turned off in step S370. The flow returns to the main routine thereafter.

Figure 20:
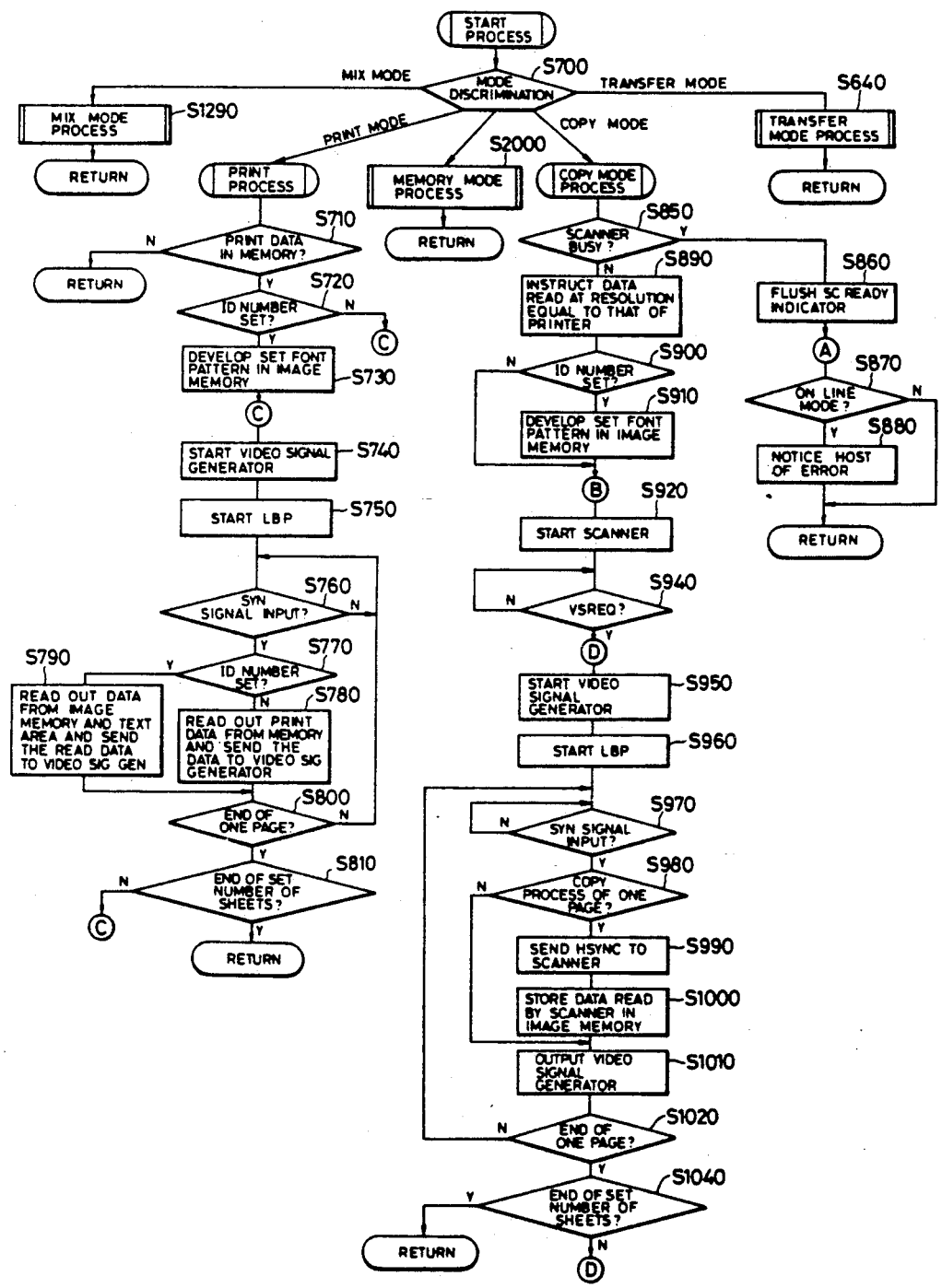

If N in step S320, the flow advances to step S380 to check if the start switch 68 is operated. If Y in step S380, the start process in step S390 shown in FIG. 20 is executed and the flow returns to the main routine.

If N in step S380, the flow advances to step S400 to check if the ten keys 81 are operated. If Y in step S400, the flow advances to step S410, and input data is stored in the key buffer 91. In step S420, the input data is displayed on the numerical display 65, and the flow then returns to the main routine. In this case, if the clear key is operated, data stored in the key buffer 91 is cleared, and the flow returns to the main routine. If N in step S400, processing corresponding to the input key switch is executed in step S430, and the flow returns to the main routine.

Figure 19:
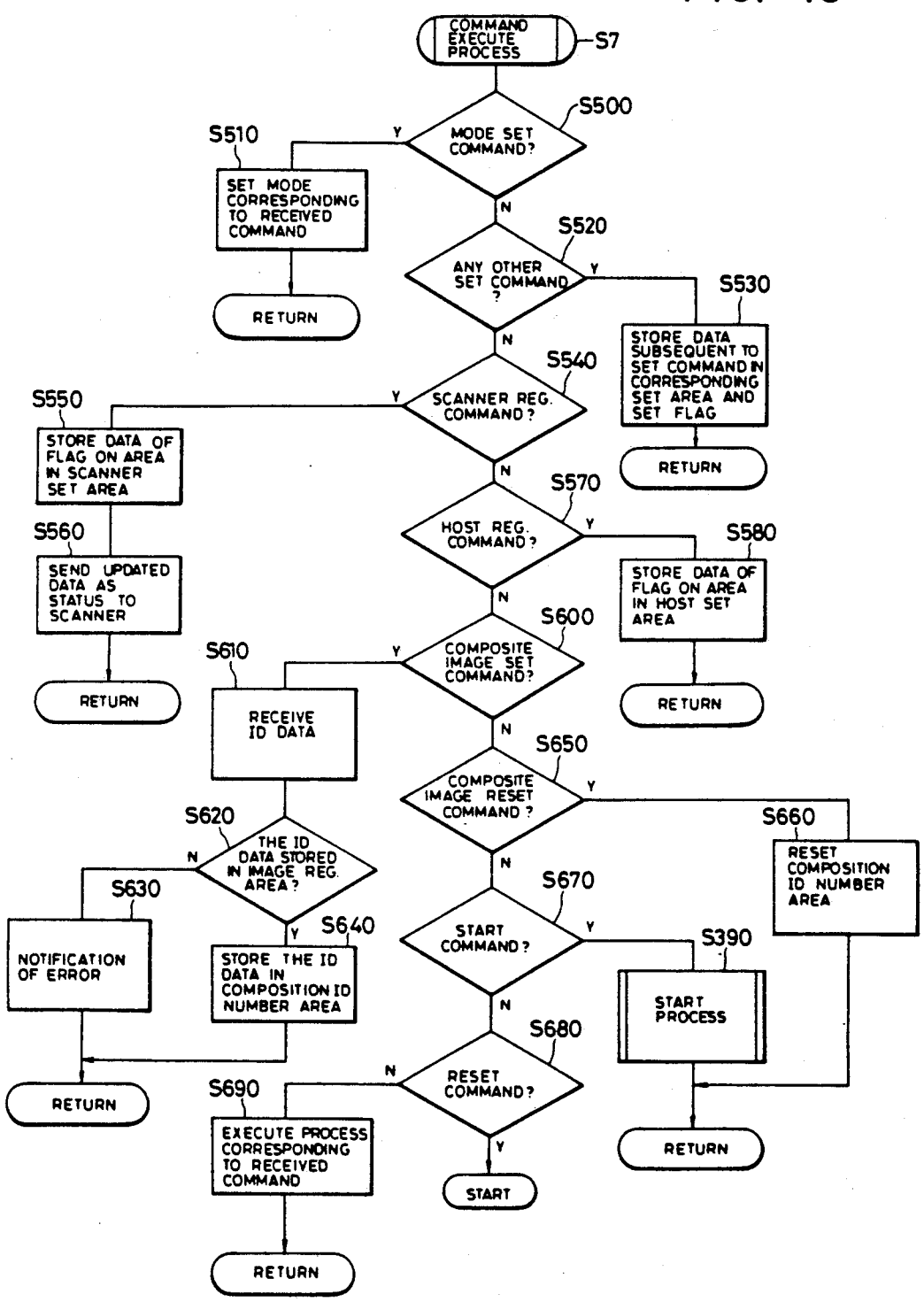

The command execution process in step S7 will be described with reference to the flow chart shown in FIG. 19.

If a command is received from the data processor in the on-line mode, it is checked in step S500 if the received command is a set command for setting the memory mode, the copy mode, the print mode, the MIX mode, or the transfer mode. If Y in step S500, the flow advances to step S510, and the mode corresponding to the received mode set command is set. After the corresponding mode is set, the flow returns to the main routine. Note that when the memory mode is set, the memory mode switch 74 is turned on, and that when the memory mode is reset, it is turned off.

If N in step S500, the flow advances to step S520 to check if the set command for designating the number of sheets to be printed out, a position of image data, a zone of image data, or a resolution of image data to be transmitted is received. If Y in step S520, the flow advances to step S530, and a set value sent together with the command is stored in the corresponding area in the RAM 2, and the update flag is set. Thereafter, the flow returns to the main routine.

The correspondence between the set commands and the set value memory areas is as follows:

| | |
|---|---|
| Number of sheet set command | Number of sheet set area 92 |
| Position set command | Position set area 94 |
| Zone set command | Zone set area 95 |
| Resolution set command | Resolution set area 93 |

If N in step S520, the flow advances to step S540 to check if a scanner registration command is received. If Y in step S540, the flow advances to step S550 and the set value updated in step S530 is stored in the corresponding area of the scanner set area 97. In step S560, the updated data is sent to the scanner 200, and the flow returns to the main routine. At this time, the update flag is reset.

If N in step S540, the flow advances to step S570 to check if a host registration command is received. If Y in step S570, the flow advances to step S580, and data updated in step S530 is stored in the host set area 96. Then, the flow returns to the main routine.

If N in step S570, it is checked in step S600 if a composite image set command is received. If Y in step S600, the flow advances to step S610, and ID data of the subsequent image pattern to be mixed is received. It is checked in step S620 if the received ID data is ID data of an image pattern stored in the RAM 2. If N in step S620, an error is signalled to the processor sending the set command in step S630 and the flow returns to the main routine. If Y in step S620, the flow advances to step S640, and the received ID data is stored in the designated composition ID number area 99c. Thereafter, the flow returns to the main routine.

If N in step S600, the flow advances to step S650 to check if a composite image reset command is received. if Y in step S650, the designated composition ID number area 99c of the RAM 2 is reset in step S660, and the flow returns to the main routine.

If N in step S650, the flow advances to step S670 to check if the start command is received. If Y in step S670, the start process in step S390 and thereafter shown in FIG. 20 (to be described later) is executed, and the flow returns to the main routine. If N in step S670, the flow advances to step S680 to check if the reset command is received. If Y in step S680, the flow returns to step S1, and the initial process is executed. If N in step S680, the flow advances to step S690, and processing corresponding to the received command is executed. Thereafter, the flow returns to the main routine.

The start process in step S390 will be described in detail with reference to the flow chart shown in FIG. 20.

The current mode is checked in step S700. If it is detected in step S700 that the transfer mode is set, the transfer process shown in FIG. 22 (to be described later) is executed in step S640, and the flow then returns to the main routine.

If the print mode is set, the print process in steps S710 and thereafter is executed. If the MIX mode is set, the MIX mode process shown in FIG. 21 (to be described later) is executed in step S1290, and the flow returns to the main routine.

Figure 23:
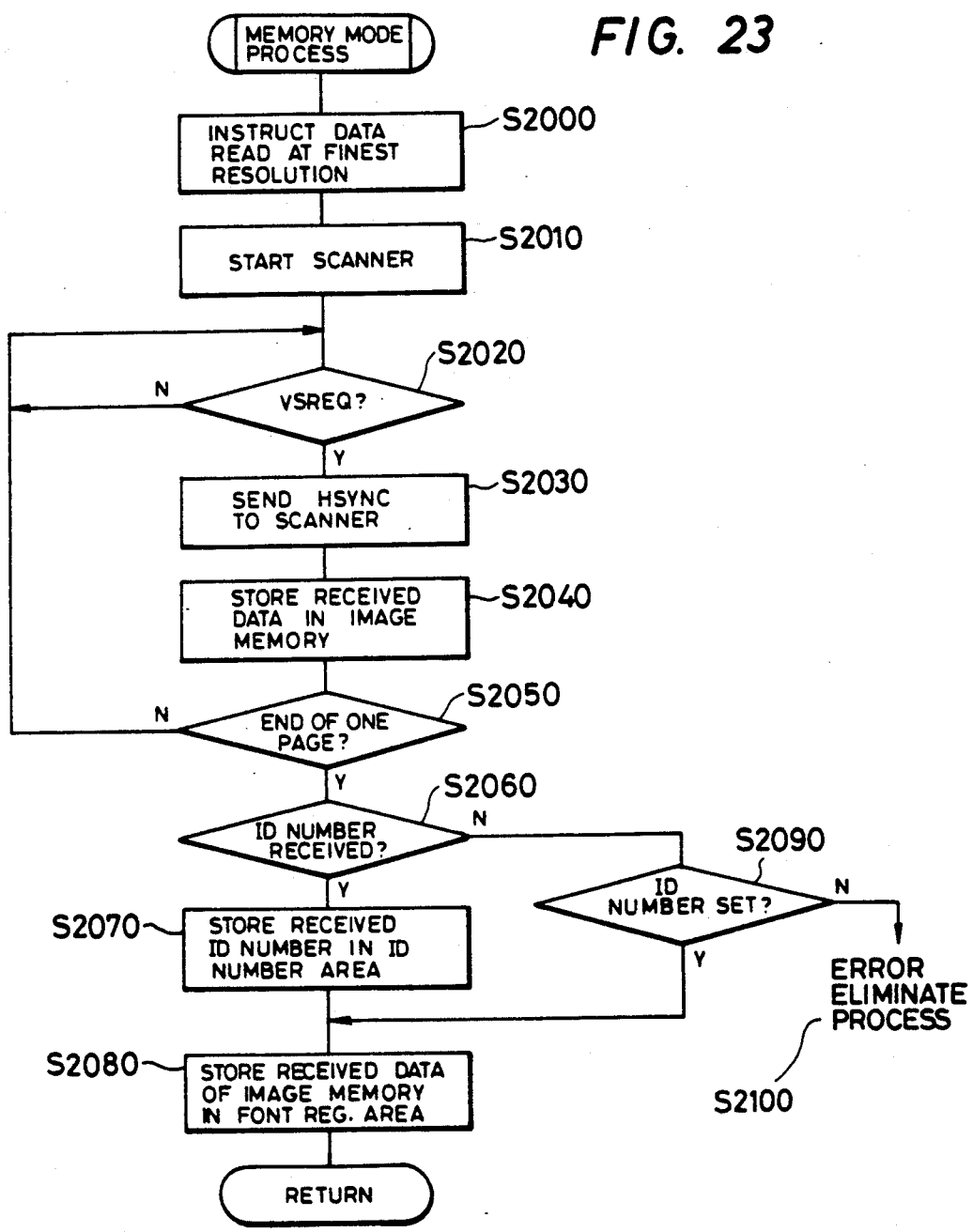

If the copy mode is set, the copy mode process in step S850 and thereafter is executed. If the memory mode is set, the memory mode process shown in FIG. 23 is executed in step S2000 and thereafter.

If the print mode is detected in step S700, the flow advances to step S710 to check if print data is stored in the text area 98 of the memory. If Y in step S710, it is checked in step S720 if an ID number is set in the designated composition ID number area 99c of the RAM 2. If N in step S720, the flow advances to step S740. If Y in step S720, an image pattern designated by the designated composition ID number area 99c in the image registration area 99 of the RAM 2 is read out in step S730, and the readout data is developed in the image memory 13. The flow then advances to step S740.

In step S740, the video signal generator 8 is enabled, and in step S750, the LBP engine unit 9 is enabled. The LBP engine unit 9 conveys a recording sheet to the position of the photosensitive body 28, thereby preparing for a recording operation. After the unit 9 is prepared for the recording operation and recording data reception, the unit 9 outputs a BD signal for requesting data transmission for one line by means of laser beams to the LBP interface 7. In step S760, the CPU 1 awaits until the BD signal as the data transfer sync signal is sent. If Y is obtained in step S760, it is checked in step S770 if the ID number is set, in the same manner as in step S720. If N in step S770, the flow advances to step S780, and print data for one line is read out from the text area 98. The readout data is sent to the video signal generator 8 at a predetermined timing.

In this case, if print data is character code data, the character code data is sent to the character generator 11, and is converted to a corresponding character pattern. The character pattern is then developed in the pattern developer 12. Print data for one line is read out from the pattern developer 12, and is sent to the video signal generator 8.

The video signal generator 8 sequentially and selectively outputs the print data to the driver circuit 61 through the selector A 53 or the selector B 54 and through the selector C 60, thereby driving the semiconductor laser. After the print operation for one line is completed in this manner, the flow advances to step S800.

If Y in step S770, the flow advances to step S790, and print data for one line is read out from the image memory 13 and the text area 98, and the readout data is sent to the video signal generator 8 at a predetermined timing. In this case, if print data is character code data, the character code data is sent to the character generator 11, and is converted to a corresponding character pattern. The character pattern is then developed in the pattern developer 12. Print data for one line is read out from the pattern developer 12, and is sent to the video signal generator 8.

The selector A 53 of the video signal generator 8 selectively outputs image data in accordance with a position and a zone designated by the scanner set area 97, so as to convert it into a pulse-width modulated drive signal corresponding to multi-level data. The drive signal is output to the OR gate 59.

The selector B 54 selectively outputs text data to the OR gate 59 in accordance with a position and a zone instructed by the host set area 96 to the OR gate 59. The OR gate 59 mixes input data, and outputs the mixed data to the selector C 60. The selector C 60 is controlled by the controller 50 so as to select the data from the OR gate 59 in the MIX mode upon instruction from the CPU 1. The mixed data is sequentially and selectively output to the driver circuit 61 to drive the semiconductor laser. Thus, the mixed data for one line (in the main scan direction) is printed out.

After the image data for one line is printed out in this manner, the flow advances to step S800 in the same manner as in step S780 to check if the print operation for one page is completed. If N in step S800, the flow returns to step S760, and data for the next line is printed.

If Y in step S800, the flow advances to step S810 to check if the print operations corresponding to the number of sheets to be printed are completed. If Y in step S810, the processing is ended, and the flow returns to the main routine. If N in step S810, the flow returns to step S740, and the next print operation is executed.

If N in step S710, the flow returns to the main routine without any processing.

If the copy mode is detected in step S700, the copy mode process is executed in step S850 and thereafter.

It is checked in step S850 if the BUSY signal from the scanner 200 is ON, i.e., if the scanner 200 is busy. If Y in step S850, since the copying operation cannot be performed, the SC REDY indicator 84 flashes in step S860. The flow advances to step S870 to check if the on-line mode is set. If N in step S870, the flow returns to the main routine. If Y in step S870, an error is signalled to the data processor in step S880, and the flow then returns.

If N in step S850, the flow advances to step S890, and the scan resolution of the scanner 200 is set to be equal to that of the printer. If the resolution of the printer is lower than the maximum resolution of the scanner 200, scanned data from the CCD 21 can be selectively output in correspondence with the resolution along the main scan direction, and a scan operation in the sub-scan direction is performed at a predetermined interval in accordance with the resolution. It is checked in step S900 if the ID number is set, in the same manner as in step S720. If Y in step S900, the flow advances to step S910, and a font pattern designated by the ID number in the image registration area 99 is developed in the image memory 13 in the same manner as in step S730. Thereafter, the flow advances to step S920. If N in step S900, the flow also advances to step S920.

In step S920, the scanner 200 is enabled and prepares for an original surface scan operation. After the scanner 200 completes preparation for scan, it outputs the VSREQ signal 203. The CPU 1 awaits in step S940 until the VSREQ signal 203 is output from the scanner 200. If Y is obtained in step S940, the flow advances to step S950, and the video signal generator 8 is enabled. In step S960, the LBP engine unit 9 is enabled. In step S970, the CPU 1 awaits until the BD signal as the data transfer request timing signal is sent from the LBP engine unit 9. If Y is obtained in step S970, the flow advances to step S980 to check if the current processing is performed for the first page, i.e., the current processing does not correspond to the copy process for the second or subsequent page. If N in step S980, the flow advances to step S1010. If Y in step S980, the flow advances to step S990. In step S990, the HSYNC signal 205 for requesting the scanner 200 to read and output data for one line (for single main scan operation) is sent to the scanner 200.

Since the scanner 200 sends multi-level digital image data for one line, the image data sent from the scanner 200 is stored in the image memory 13 in step S1000, and the flow advances to step S1010. If an image pattern has already been developed in the image memory 13, image data from the scanner 200 is stored thereon. In step S1010, the image data is read out from the image memory 13, and is output to the video signal generator 8. The video signal generator 8 executes the following processing directly if the output timing of the printer is synchronized with the data send timing of the scanner 200 or after the image data is temporarily stored in the 1-line buffer 51 if synchronization cannot be achieved. The image data selected by the selector A 53 is sequentially and selectively output to the driver circuit 61 through the selector C 60, thereby driving the semiconductor laser. When the image data for one line is printed out in this manner, it is cheched in step S1020 if the print operation for one page is completed. If N in step S1020, the flow returns to step S970, and the print process for the next 1-line data is executed.

If Y in step S1020, the flow advances to step S1040 to check if the print operations corresponding to the set number of sheets are completed. If Y in step S1040, the processing is ended, and the flow returns to the main routine. If N in step S1040, the next print operation can be performed while reading out image data from the image memory 13. Thus, the flow returns to step S950.

Figure 21:
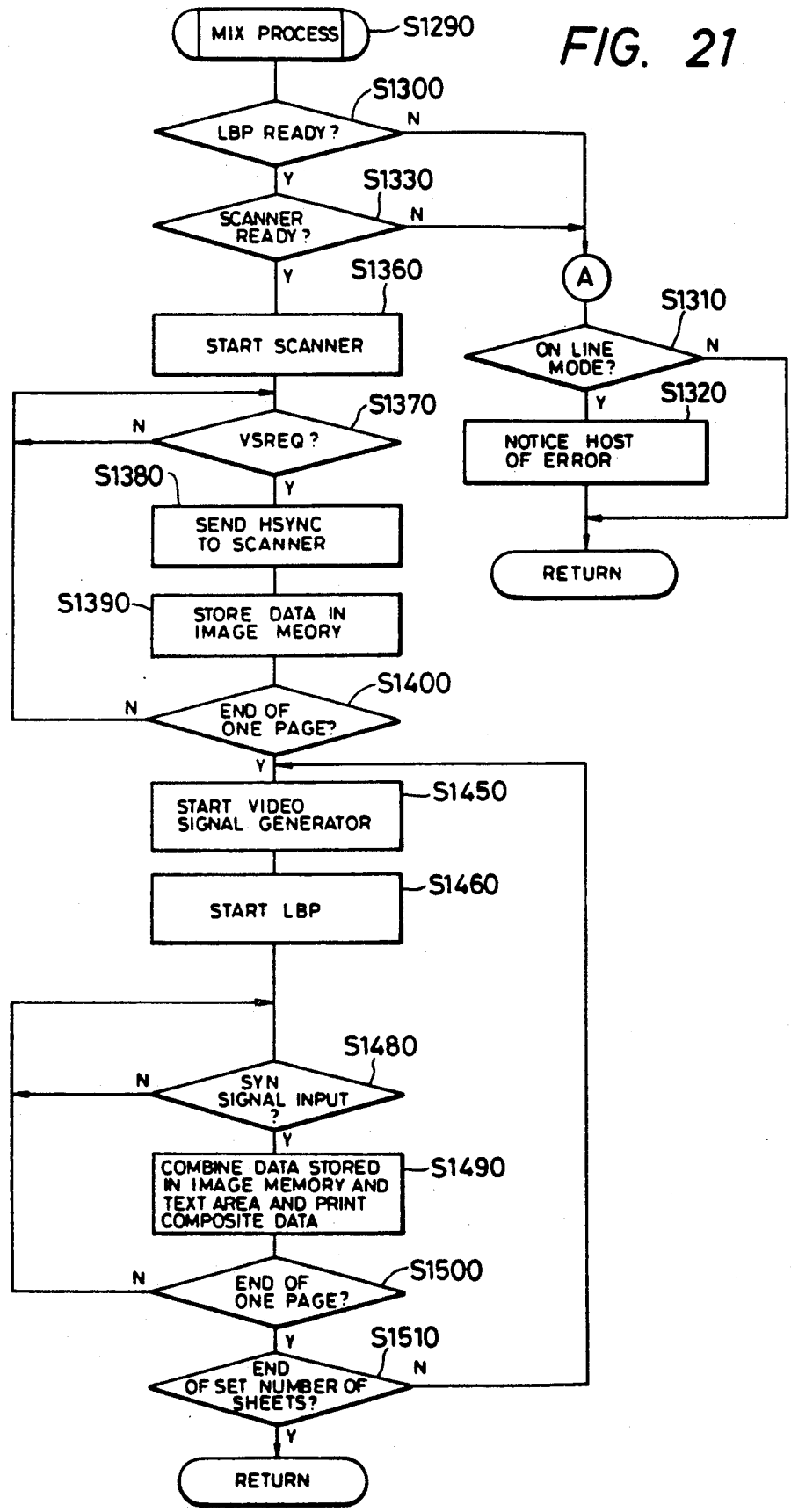

The MIX mode process in step S1290 will be described with reference to FIG. 21.

It is checked in step S1300 if the LBP engine unit 9 is ready. If N in step S1300, the print process cannot be executed, and it is checked in step S1310 if the on-line mode is set. If Y in step S1310, the flow advances to step S1320 to inform an error to the data processor. The flow then returns to the main routine. If N in step S1310, the processing is interrupted, and the flow returns to the main routine.

If Y in step S1300, the flow advances to step S1330 to check if the scanner 200 is ready. If N in step S1330, the MIX mode processing cannot be executed, and the flow advances to step S1310.

If Y in step S1330, the flow advances to step S1360, and an enable command is supplied from the scanner interface 10 to the scanner 200 through the control bus 206. Thus, the scanner 200 prepares for the original surface scan operation. After this preparation is completed, the scanner 200 outputs the VSREQ signal 203. The CPU 1 awaits in step S1370 until the VSREQ signal 203 is output from the scanner 200 If Y is obtained in step S1370, the flow advances to step S1380, and the CPU 1 outputs the HSYNC signal to the scanner 200. Since the scanner 200 subsequently sends multi-level digital image data for one line, the CPU 1 stores the image data in the image memory 13 in step S1390.

After the image data for one line is stored, it is checked in step S1400 if data storage for one page is completed. If N in step S1400, the flow returns to step S1370.

If Y in step S1400, the flow advances to step S1450, and the video signal generator 8 is enabled. In step S1460, the LBP engine unit 9 is enabled in the same manner as in step S750. In step S1480, the CPU 1 awaits until the BD signal is supplied. If Y is obtained in step S1480, the flow advances to step S1490, and print data for one line is read out from the image memory 13 and the text area 98 in the same manner as in step S790 in FIG. 20, and is sent to the video signal generator 8 at a predetermined timing.

When the print operation for one line is completed in this manner, it is checked in step S1500 if the print operation for one page is completed. If N in step S1500, the flow returns to step S1480, and data for the next line is printed.

If Y in step S1500, the flow advances to step S1510 to check if the print operations corresponding to the number of sheets to be printed are completed. If Y in step S1510, the processing is ended and the flow returns to the main routine. If N in step S1510, the flow returns to step S1450, and the next print operation is executed.

The transfer process in step S640 will be described with reference to the flow chart shown in FIG. 22.

It is checked in step S1790 if the on-line mode is set. If N in step S1790, the flow immediately returns to the main routine. If Y in step S1790, the flow advances to step S1810, and the CPU 1 instructs the scanner 200 to scan image data at a maximum resolution. In steps S1820 to S1860, data for one page is read from the scanner 200 in the same manner as in steps S1360 to S1400, and is stored in the image memory 13.

After the image data for one page is read, a transmission request is sent to the data processor in step S1880. The transmission request is output to the data processor as a command through the serial interface 4, or as a request signal through the parallel interface 6. The CPU 1 awaits in step S1890 until the data processor prepares for reception. The flow advances to step S1900, and the compander 16 is enabled. In step S1910, the data converter 17 is enabled. In step S1920, the image data is read out from the image memory 13, and is converted to data having a resolution and a data format designated by the host set area 96, in step S1930. In step S1940, the converted data is transferred to the data processor.

More specifically, image data processed by the data processor often has a lower resolution than the scan resolution of the scanner 200, and is not multi-level gradation data. Such data is often dither-processed data or binary data. In this embodiment, when multi-level data is sent in this case, this undesirably delays processing. Therefore, the image data output apparatus 100 converts data to data having a data format corresponding to the processing format of the data, and then outputs the converted data.

In this case, in addition to resolution conversion of data, multi-level 6-bit multi-gradation image data from the scanner 200 is compressed/expanded by known data compression/expansion processing by the compander 16, and the multi-level data is converted to dither-processed binary data by the data converter 17. The binary data is sent to the data processor. Thus, desired image data can be transferred in a short data transfer time.

If data transfer to the data processor is completed in step S1940, it is checked in step S1950 if data transfer for one page is completed. If Y in step S1950, the processing is ended, and the flow returns to the main routine. If N in step S1950, the flow returns to step S1900, and the next image data is transferred.

The memory mode process in step S2000 will be described hereinafter with reference to the flow chart shown in FIG. 23.

Figure 22:
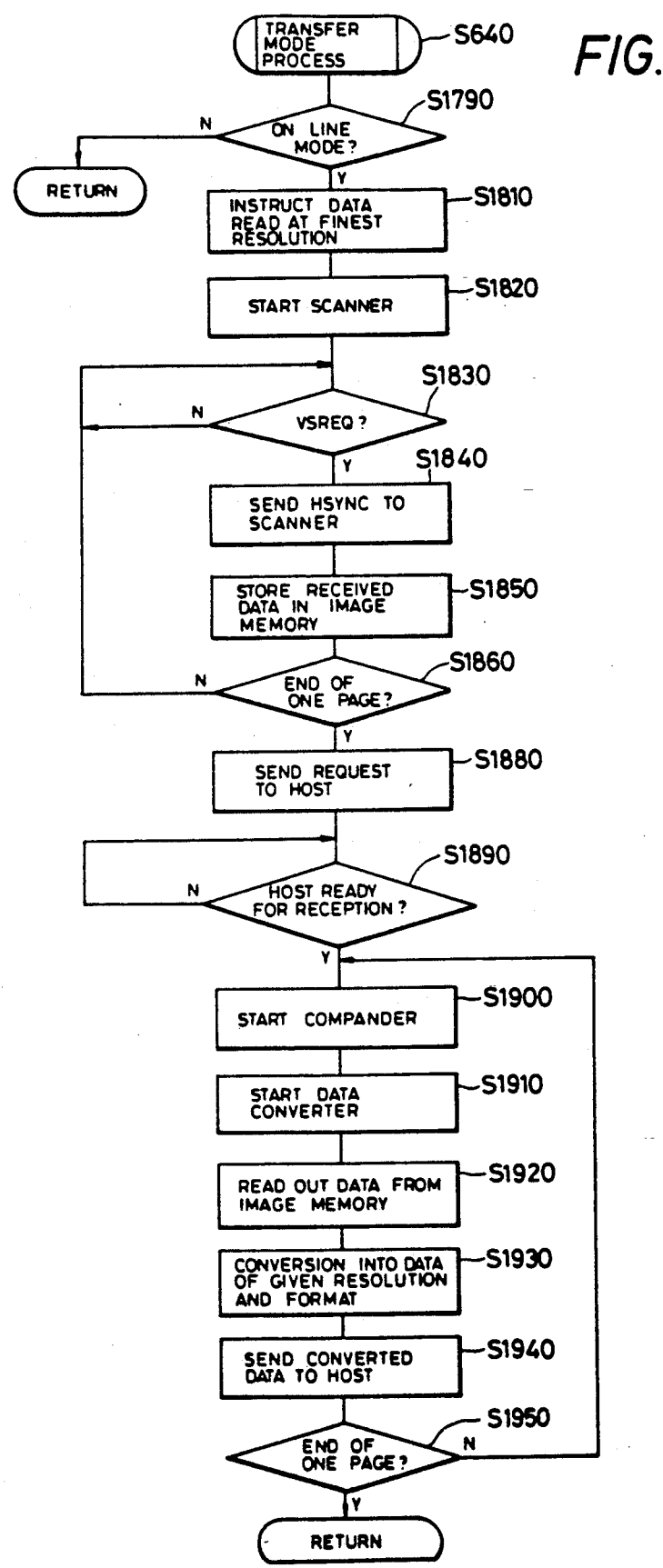

In the memory mode process, in steps S2000 to S2050, the scanner 200 is enabled and an original image for one page is read in the same manner as in steps S1810 to S1860 in FIG. 22. It is checked in step S2060 if received scanned image data includes ID number data. If Y in step S2060, the ID number is not stored in the image memory 13, and is stored in the designated composition ID number area 99c in the RAM 2 in step S2070. The ID number is written at a 0 predetermined location of an original with OCR characters or the like, and can be clearly discriminated from other image data.

In step S2080, the content of the designated component ID number area 99c is stored in the ID number memory area 99a of the image registration area 99, and image data to be registered, which has stored in the image memory 13, is stored in the registration image memory area 99b. Thus, image registration is completed, and the flow returns to the main routine.

If N in step S2060, the flow advances to step S2090 to check if the ID number is stored in the designated composition ID number area 99c. If N in step S2090, this means an operation error, and the error process is executed in step S2100. If Y in step S2090, the flow advances to step S2080.

More specifically, a registration image from the scanner 200 is a mesh pattern. The mesh pattern can be a pattern representing a data volume (memory capacity necessary for storing image data) of scanned image data, a mesh pattern as a standard for cutting a zone of scanned image data, or a mesh pattern indicating a unit of line or column if data to be printed out is a character pattern. In addition, the mesh pattern can be a mesh pattern in m/m representing an area of a zone.

The registration image is not limited to one scanned by the scanner 200 but can be supplied from the data processor.

In this case, the data processor controls such that the memory mode is set, and thereafter, a registration number and a registration font are sent therefrom. If it is detected in step S6 of FIG. 8 that no command is received, and if the memory mode is set, and the reception data includes an ID number, or if the designated composition ID number area 99c is set prior thereto, it is discriminated that the subsequent reception data is a registration image can be stored in the font registration area 99.

According to this embodiment as described above, the image data output apparatus can control the image data scanning apparatus. A mesh pattern which is registered in advance is selected by the data processor, and can be mixed with scanned image data from the scanner 200 or text data from the data processor. Therefore, image data can be easily extracted and can be easily discriminated.

The present invention is not limited to the above embodiments, and various other changes and modifications may be made within the scope of claims.

What is claimed is:

1. An image output apparatus comprising:
    first interface means for inputting image data comprising multi-value data representing a gradation;
    second interface means for connecting said image output apparatus to an external data processing apparatus; and
    output means for outputting image data from said image output apparatus for image formation by an image forming unit on the basis of data input through either of said interface means,
    wherein said first and second interface means and said output means are structured so as to enable sending of the image data input through said first interface means from the second interface means to the external data processing apparatus, using a bus line which is also used for inputting image data from the external data processing apparatus.

2. An image output apparatus according to claim 1, further comprising data processing means for converting the image data input through said first interface means to be a form suitable to be processed in the external data processing apparatus.

3. An image output apparatus according to claim 1, wherein said data processing means performs resolution conversion processing on the image data input through said first interface means.

4. An image processing method comprising the steps of:
    inputting image data comprising multi-value data representing a gradation;
    selecting a mode for image formation based on the input image data or a mode for outputting the input image data to an external processing apparatus;
    forming an image on the basis of the input image data when the image formation mode is selected; and
    outputting the input image data to the external processing apparatus employing a bus line used in inputting data from the external processing apparatus, when the image data output mode is selected.

5. An image processing method according to claim 4, further comprising the step of converting the input image data to be a form to be processed in the external processing apparatus.

* * * * *